United States Patent
Aiba et al.

(10) Patent No.: US 10,050,759 B2
(45) Date of Patent: *Aug. 14, 2018

(54) MOBILE STATION APPARATUS AND COMMUNICATION METHOD

(71) Applicant: SHARP KABUSHIKI KAISHA, Osaka-shi, Osaka (JP)

(72) Inventors: Tatsushi Aiba, Osaka (JP); Shohei Yamada, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 175 days.

This patent is subject to a terminal disclaimer.

(21) Appl. No.: 15/094,140

(22) Filed: Apr. 8, 2016

(65) Prior Publication Data

US 2016/0226642 A1 Aug. 4, 2016

Related U.S. Application Data

(60) Continuation of application No. 14/091,312, filed on Nov. 26, 2013, now Pat. No. 9,325,471, which is a (Continued)

(30) Foreign Application Priority Data

Jul. 29, 2009 (JP) .................................. 2009-175973

(51) Int. Cl.
*H04W 4/00* (2018.01)
*H04W 24/00* (2009.01)
(Continued)

(52) U.S. Cl.
CPC ............ *H04L 5/0053* (2013.01); *H04L 5/001* (2013.01); *H04L 5/0055* (2013.01); *H04W 72/0413* (2013.01)

(58) Field of Classification Search
CPC ....... H04L 5/001; H04L 5/0053; H04L 5/0055; H04W 72/0413
See application file for complete search history.

(56) References Cited

U.S. PATENT DOCUMENTS 8,619,615 B2   12/2013 Aiba et al.
8,750,228 B2 *  6/2014 Aiba ....................... H04L 5/001
                                                                   370/329
(Continued)

OTHER PUBLICATIONS

European Search Report issued in European Patent Application No. 10804461.1 dated Dec. 6, 2012.
(Continued)

*Primary Examiner* — Alpus H Hsu
(74) *Attorney, Agent, or Firm* — Birch, Stewart, Kolasch & Birch, LLP

(57) ABSTRACT

A mobile station (MS) receives, from a base station (BS), information which is used to assign a PUSCH resource; transmits uplink control information using a single PUCCH resource in case that the PUSCH resource is not assigned and a plurality of PUCCH resources is assigned; transmits the uplink control information using the PUSCH resource assigned on a first uplink component carrier (UCC) in case that the PUSCH resource is assigned on the first UCC, the first UCC is used for transmitting the uplink control information using the single PUCCH resource in case that the PUSCH resource is not assigned and the plurality of PUCCH resources is assigned; and receives the uplink control information using the PUSCH resource assigned on a second UCC in case that the PUSCH resource is not assigned on the first UCC but the PUSCH resource is assigned on the second UCC.

8 Claims, 11 Drawing Sheets

Related U.S. Application Data division of application No. 13/387,662, filed as application No. PCT/JP2010/062726 on Jul. 28, 2010, now Pat. No. 8,619,615.

(51) Int. Cl.
*H04W 28/00* (2009.01)
*H04W 72/04* (2009.01)
*H04L 12/26* (2006.01)
*H04L 5/00* (2006.01)

(56) References Cited

U.S. PATENT DOCUMENTS

| | | | |
|---|---|---|---|
| 8,797,977 B2* | 8/2014 | Aiba | H04L 1/0026 370/252 |
| 8,811,262 B2 | 8/2014 | Chung et al. | |
| 8,995,376 B2 | 3/2015 | Pan et al. | |
| 9,402,247 B2* | 7/2016 | Bala | H04L 5/001 |
| 2010/0232382 A1 | 9/2010 | Gauvreau et al. | |
| 2010/0254329 A1 | 10/2010 | Pan et al. | |
| 2010/0271970 A1 | 10/2010 | Pan et al. | |
| 2010/0296389 A1 | 11/2010 | Khandekar et al. | |
| 2010/0322158 A1 | 12/2010 | Lee et al. | |
| 2011/0013581 A1 | 1/2011 | Lee et al. | |
| 2011/0038271 A1 | 2/2011 | Shin et al. | |
| 2011/0141928 A1 | 6/2011 | Shin et al. | |
| 2011/0141941 A1 | 6/2011 | Lee et al. | |
| 2011/0188594 A1 | 8/2011 | Kim et al. | |
| 2011/0243087 A1 | 10/2011 | Ahn et al. | |
| 2011/0261776 A1 | 10/2011 | Ahn et al. | |
| 2011/0274043 A1* | 11/2011 | Nam | H04L 5/001 370/328 |
| 2011/0274071 A1 | 11/2011 | Lee et al. | |
| 2011/0287804 A1 | 11/2011 | Seo et al. | |
| 2011/0299467 A1 | 12/2011 | Kim et al. | |
| 2011/0310759 A1* | 12/2011 | Gerstenberger | H04L 5/001 370/252 |
| 2012/0099441 A1 | 4/2012 | Jung et al. | |
| 2012/0113831 A1* | 5/2012 | Pelletier | H04L 5/0053 370/252 |
| 2012/0127950 A1 | 5/2012 | Chung et al. | |
| 2013/0176957 A1* | 7/2013 | Gao | H04L 5/0007 370/329 |

OTHER PUBLICATIONS

InterDigital, "Bandwidth Aggregation Component Carrier Configuration Requirements", 3GPP TSG-RAN WG2 Meeting #66bis, R2-093740, Los Angeles, USA, Jun. 29-Jul. 3, 2009.

International Search Report issued in PCT Applciation No. PCT/JP2010/062726 dated Nov. 2, 2010.

LG Electronics, "UCI piggybacking on PUSCH in case of transmit power limitation", 3GPP TSG RAN WG1 #56bis, R1-091205, Seoul Korea, Mar. 23-27, 2009.

NTT DOCOMO, "Initial Access Procedure for Asymmetric Wider Bandwidth in LTE-Advanced", 3GPP TSG RAN WG1 Meeting #55, R1-084249, Prague, Czech Republic, Nov. 10-14, 2008.

U.S. Notice of Allowance issued in U.S. Appl. No. 13/387,662 dated Aug. 26, 2013.

U.S. Office Action issued in U.S. Appl. No. 13/387,662 dated Jun. 12, 2013.

U.S. Office Action issued in U.S. Appl. No. 13/387,662 dated Nov. 19, 2012.

U.S. Notice of Allowance issued in U.S. Appl. No. 14/091,312 dated Dec. 21, 2015.

U.S. Office Action issued in U.S. Appl. No. 14/091,312 dated Jul. 24, 2015.

* cited by examiner

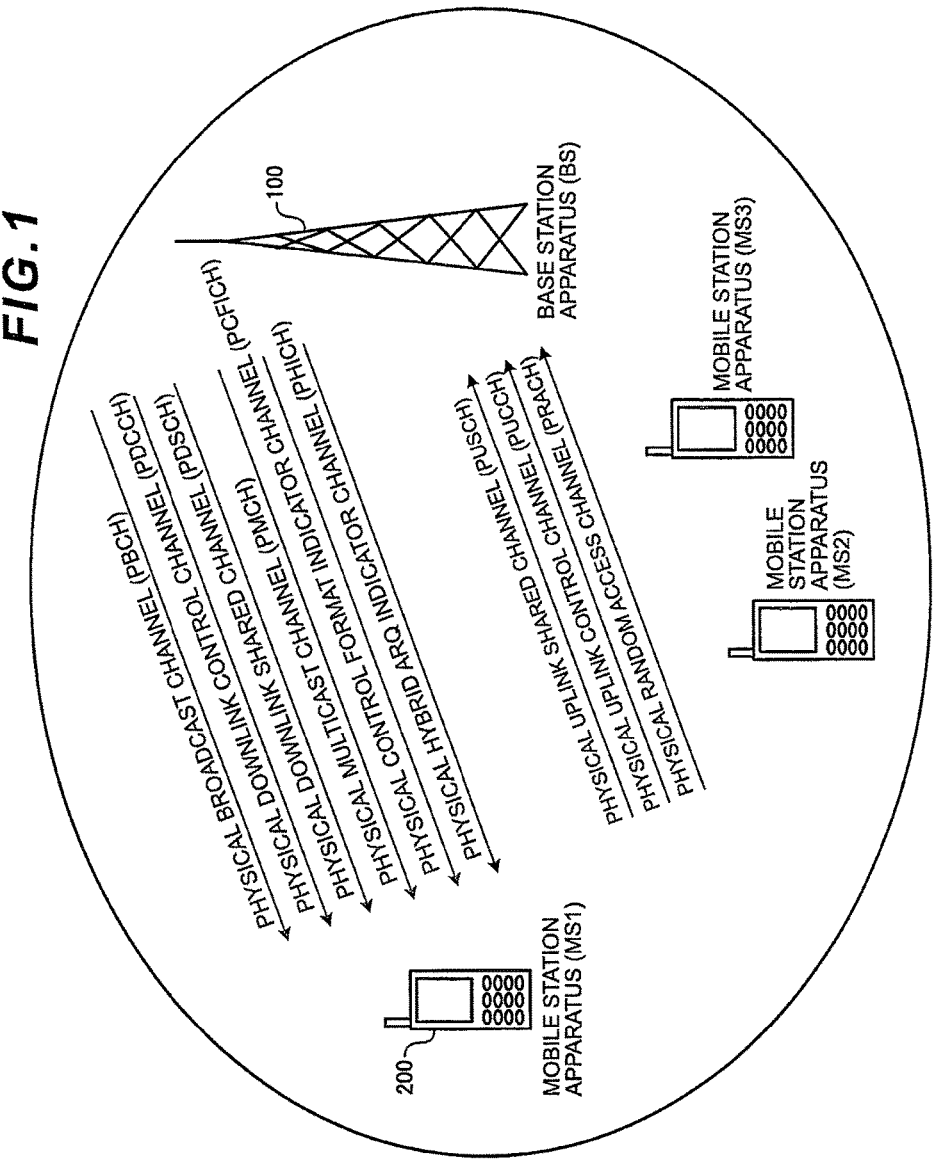

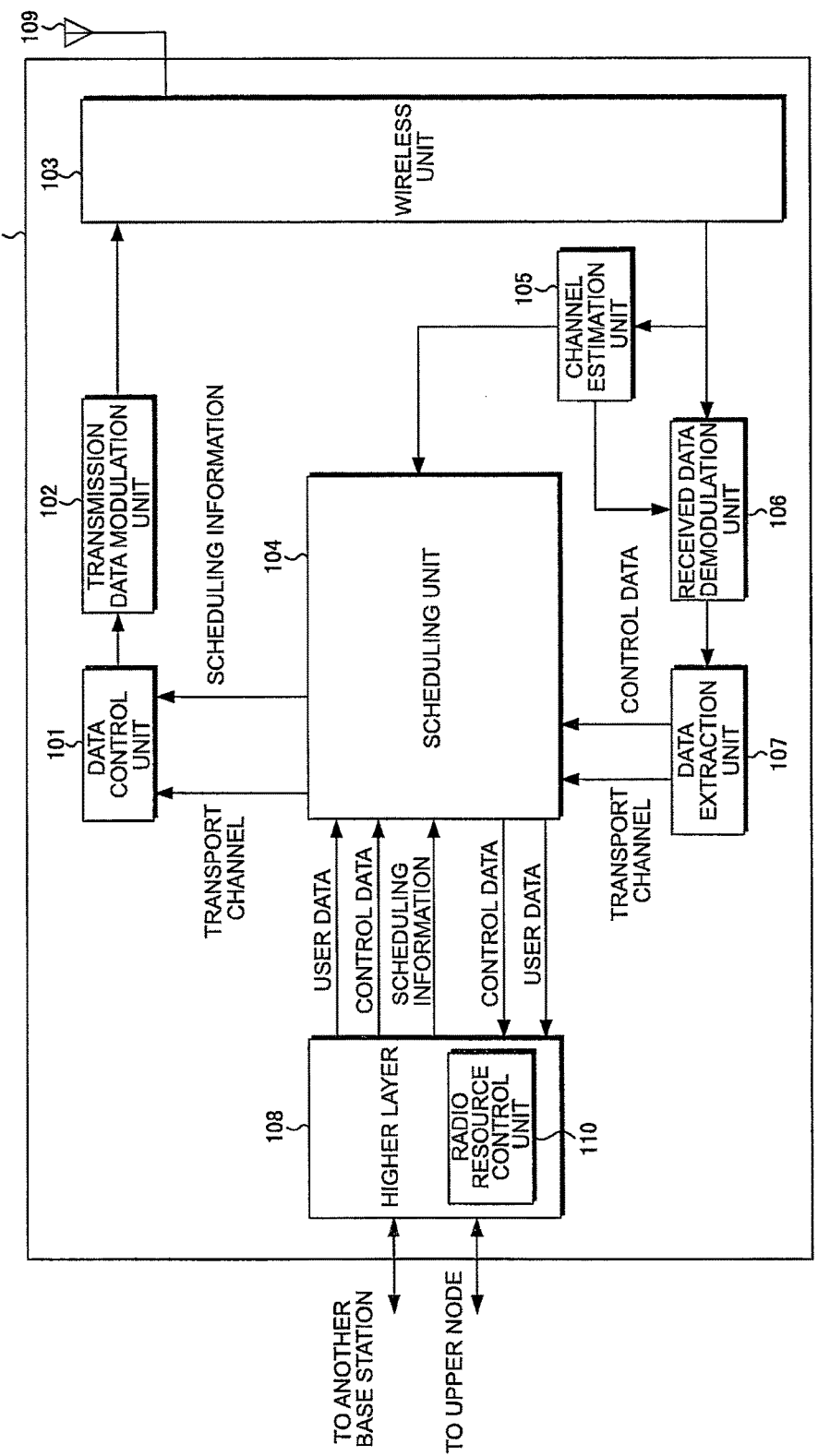

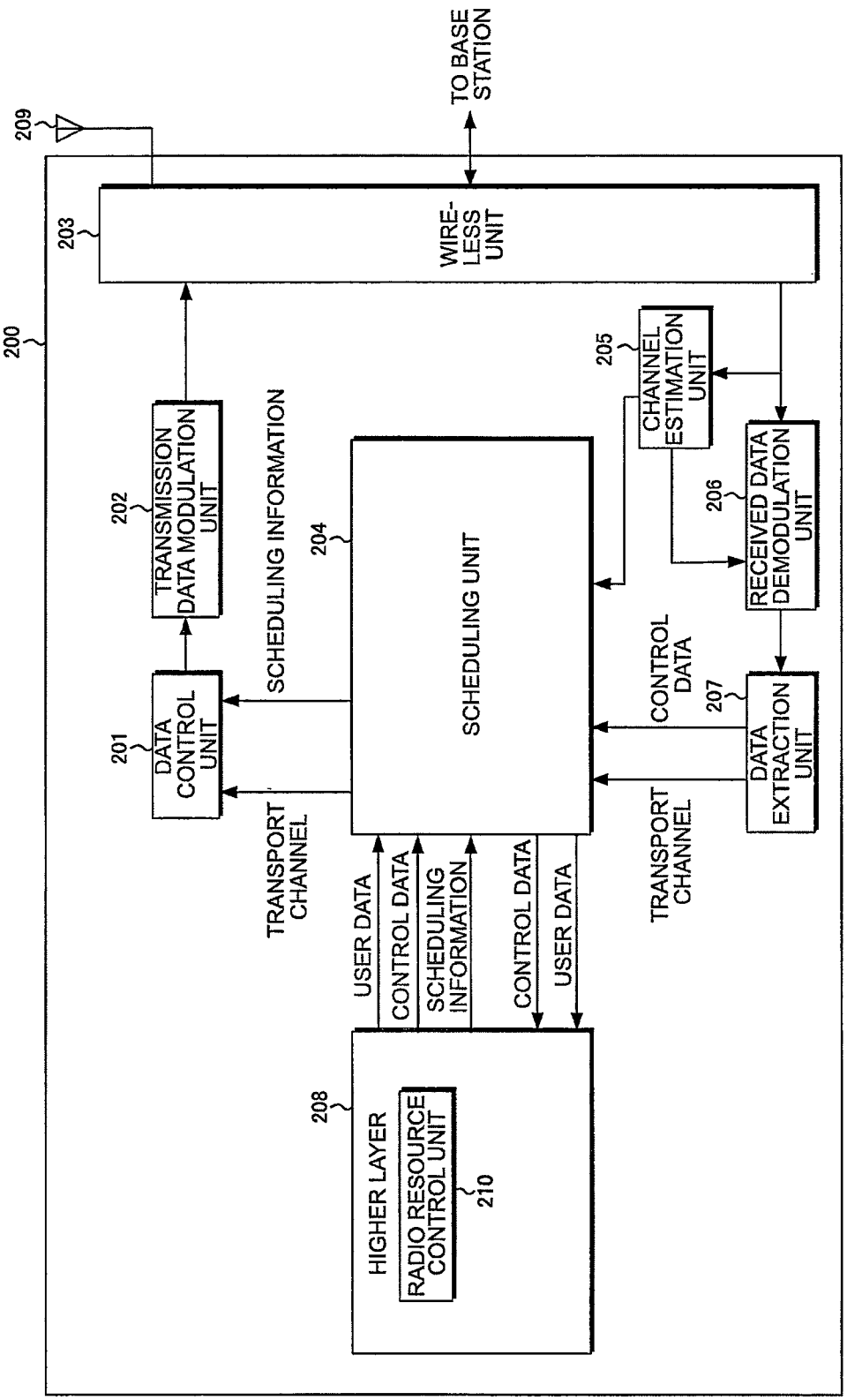

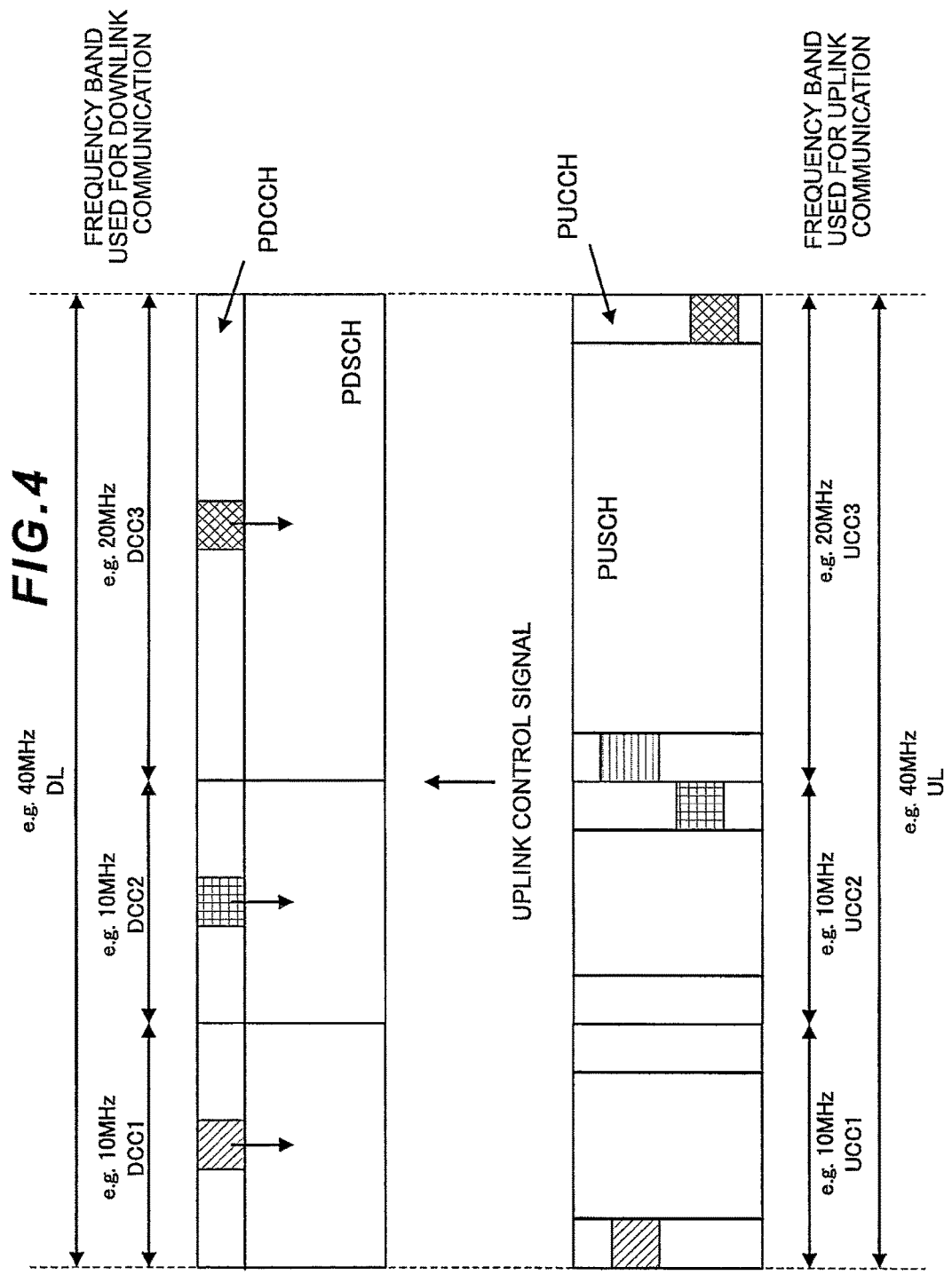

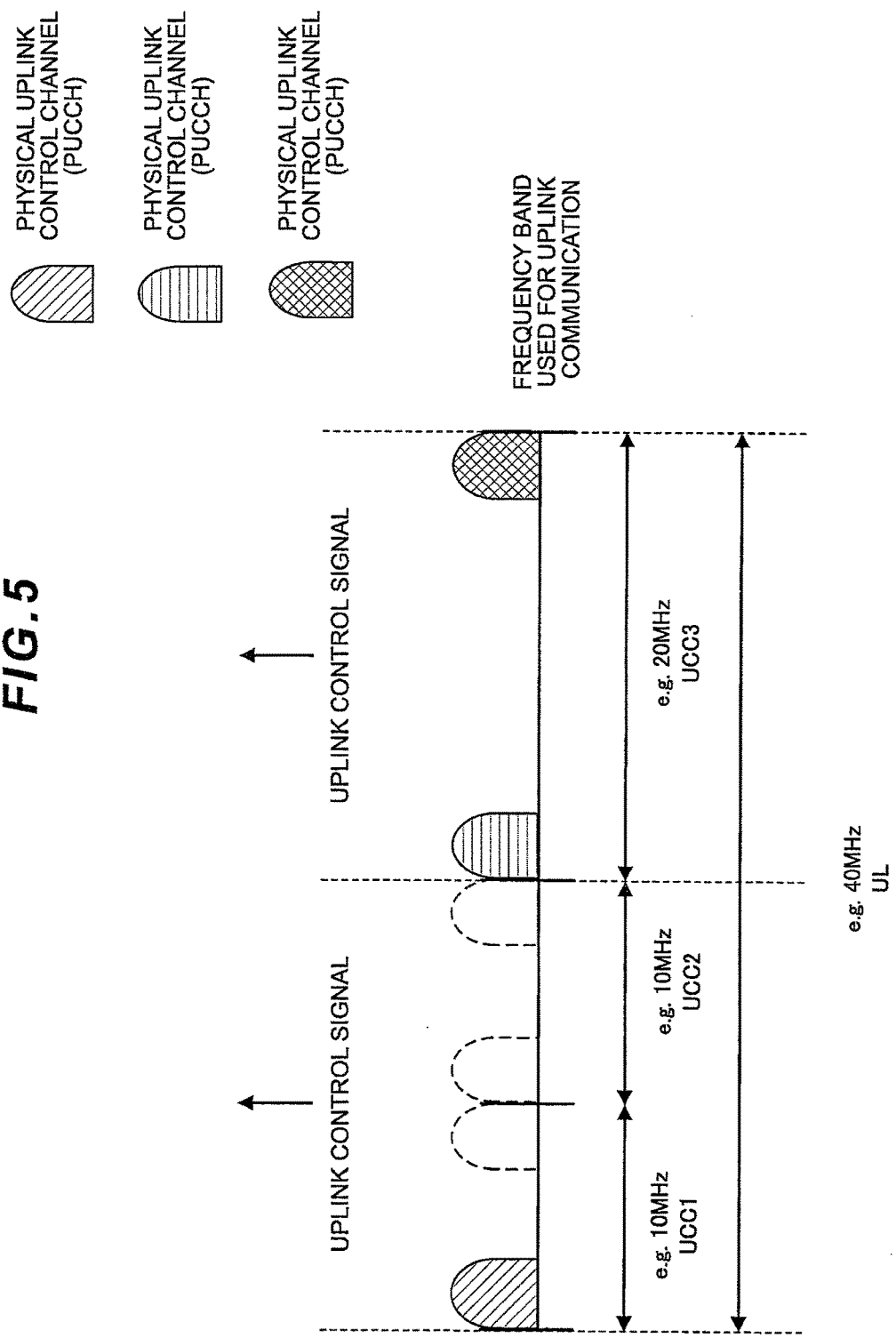

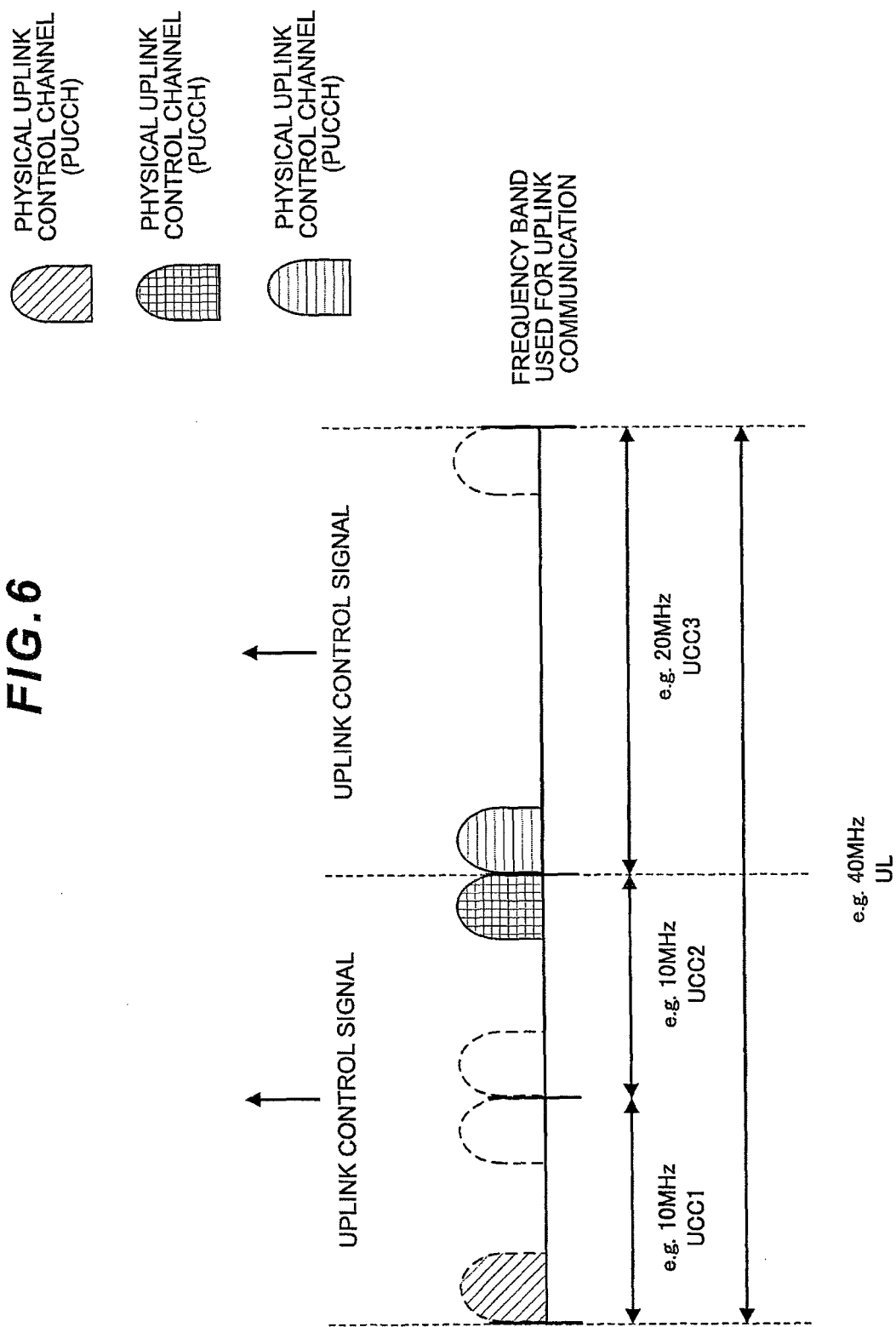

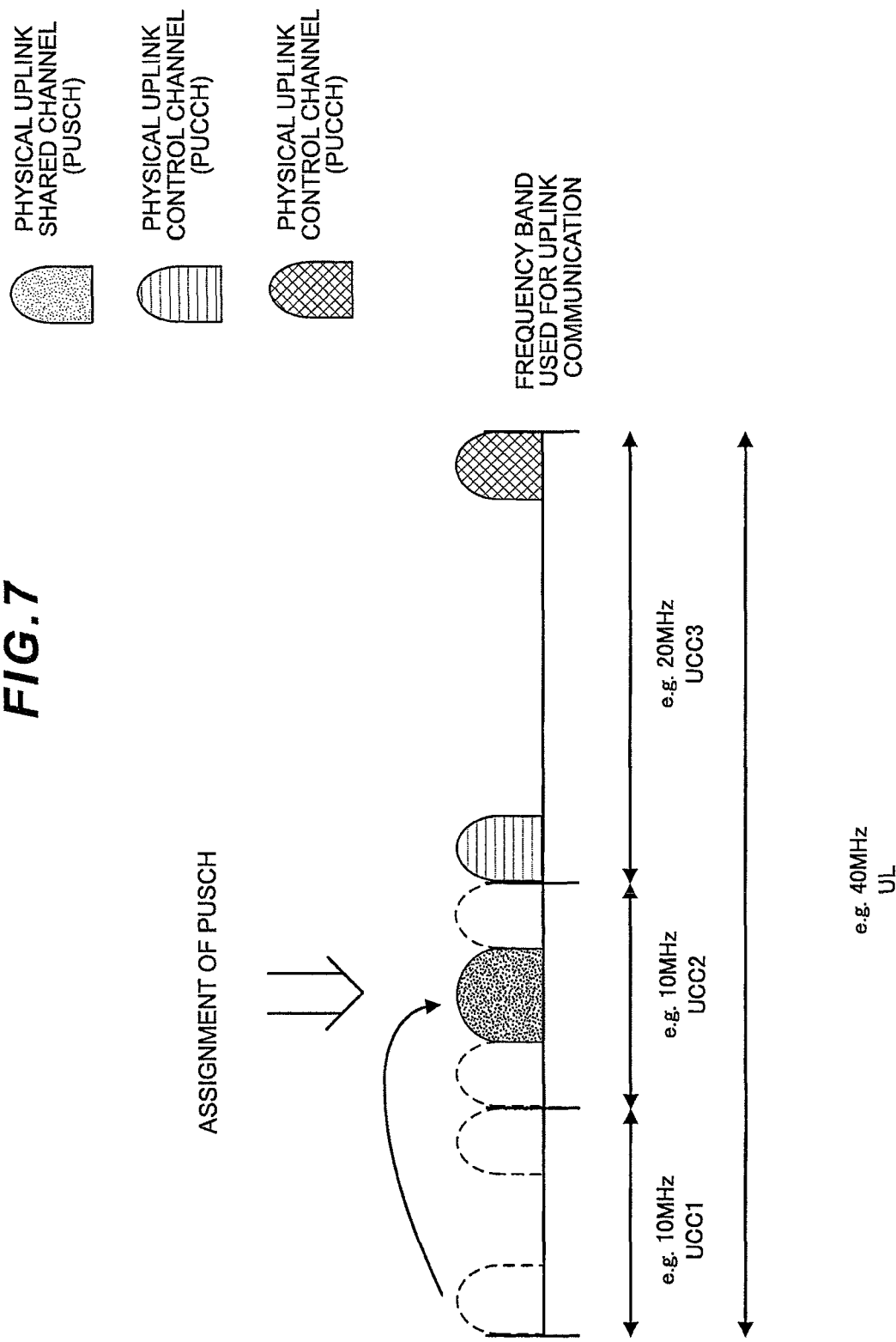

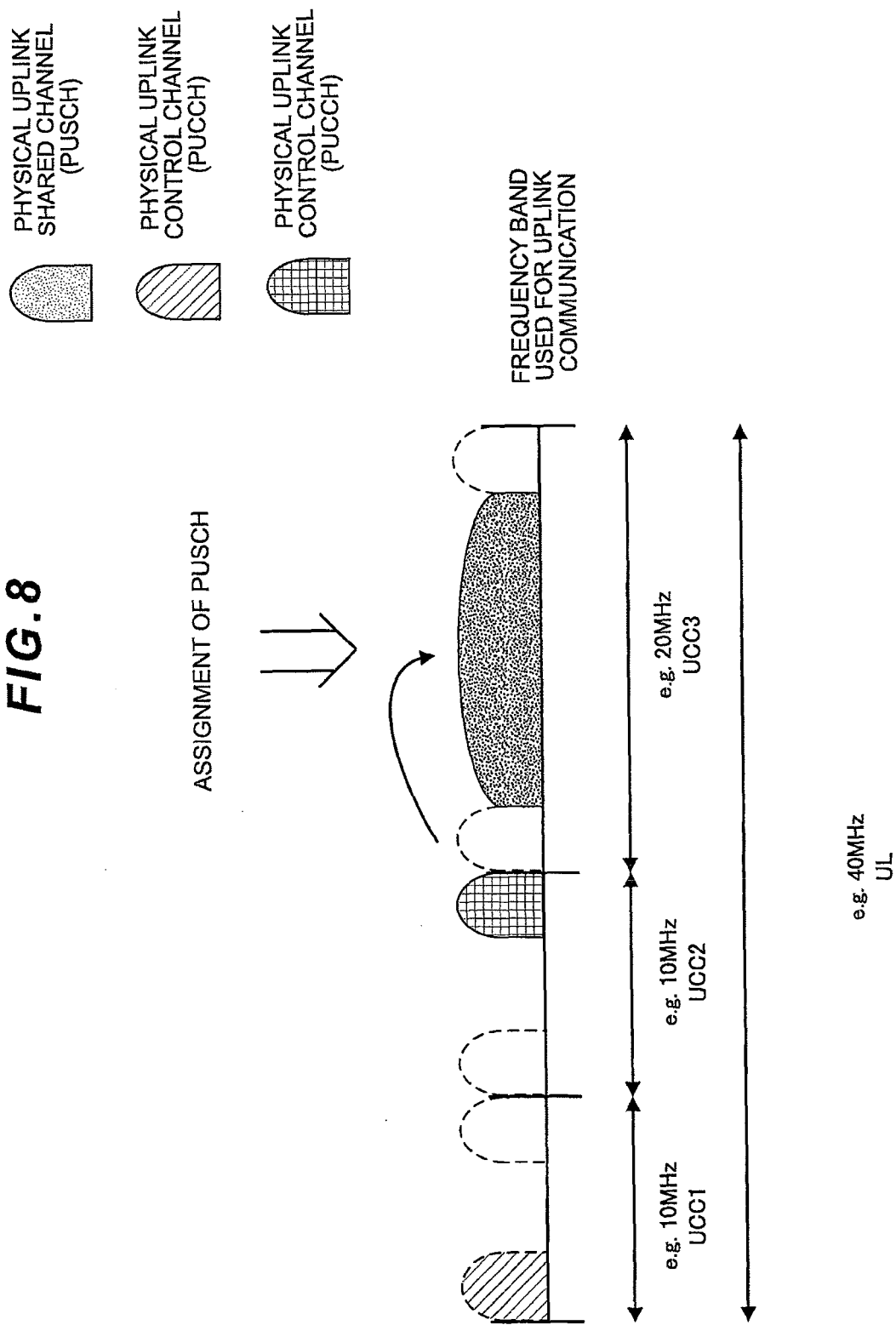

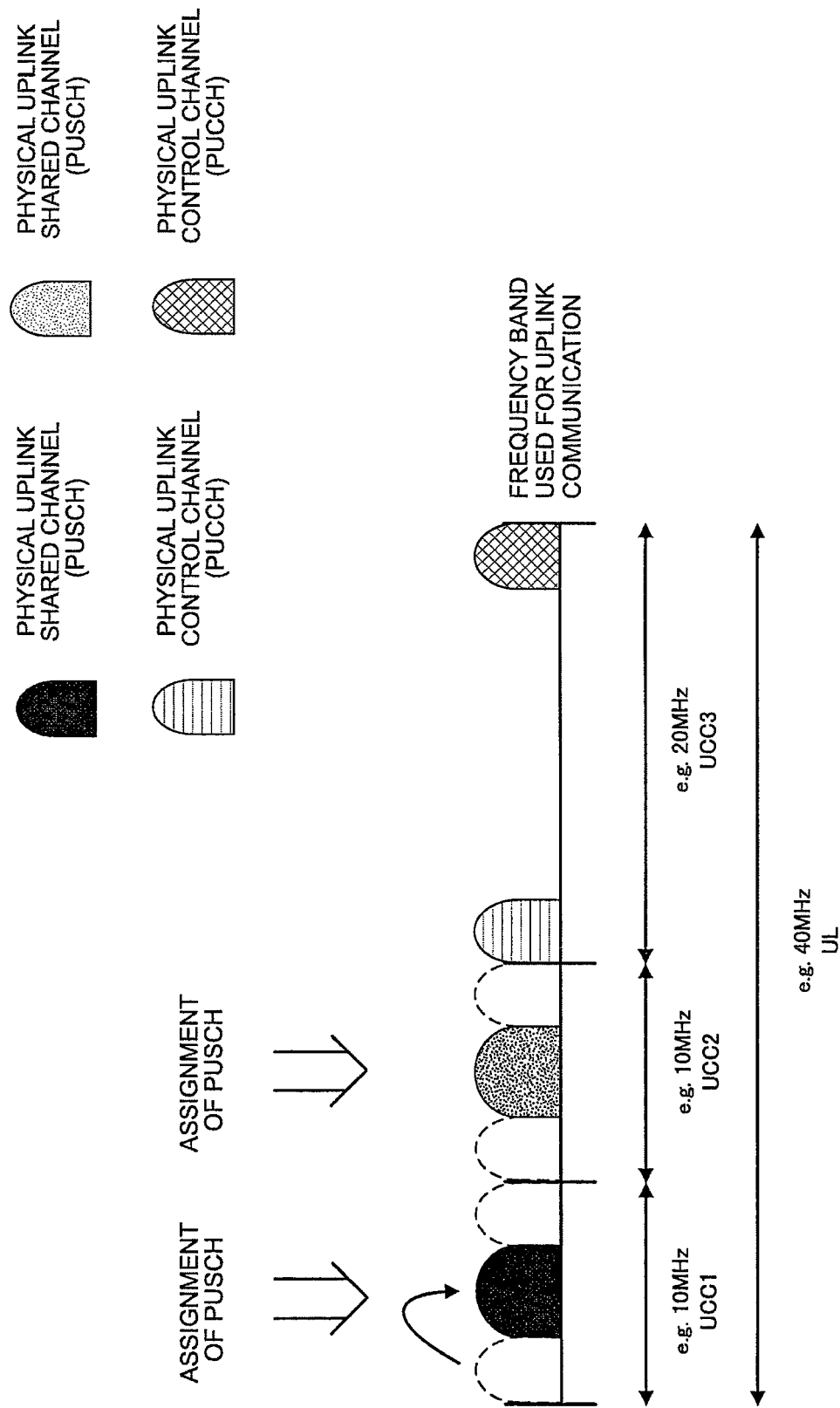

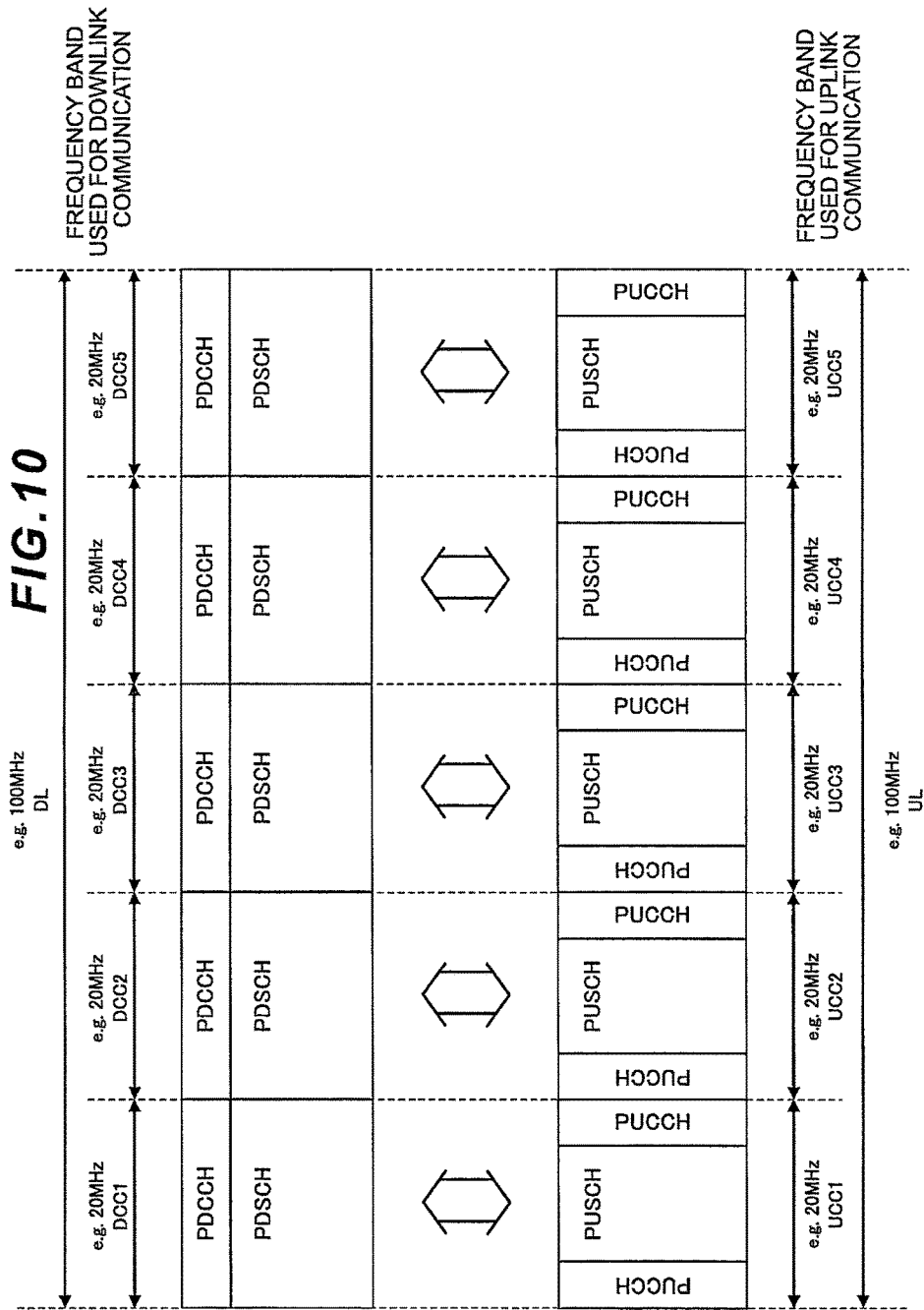

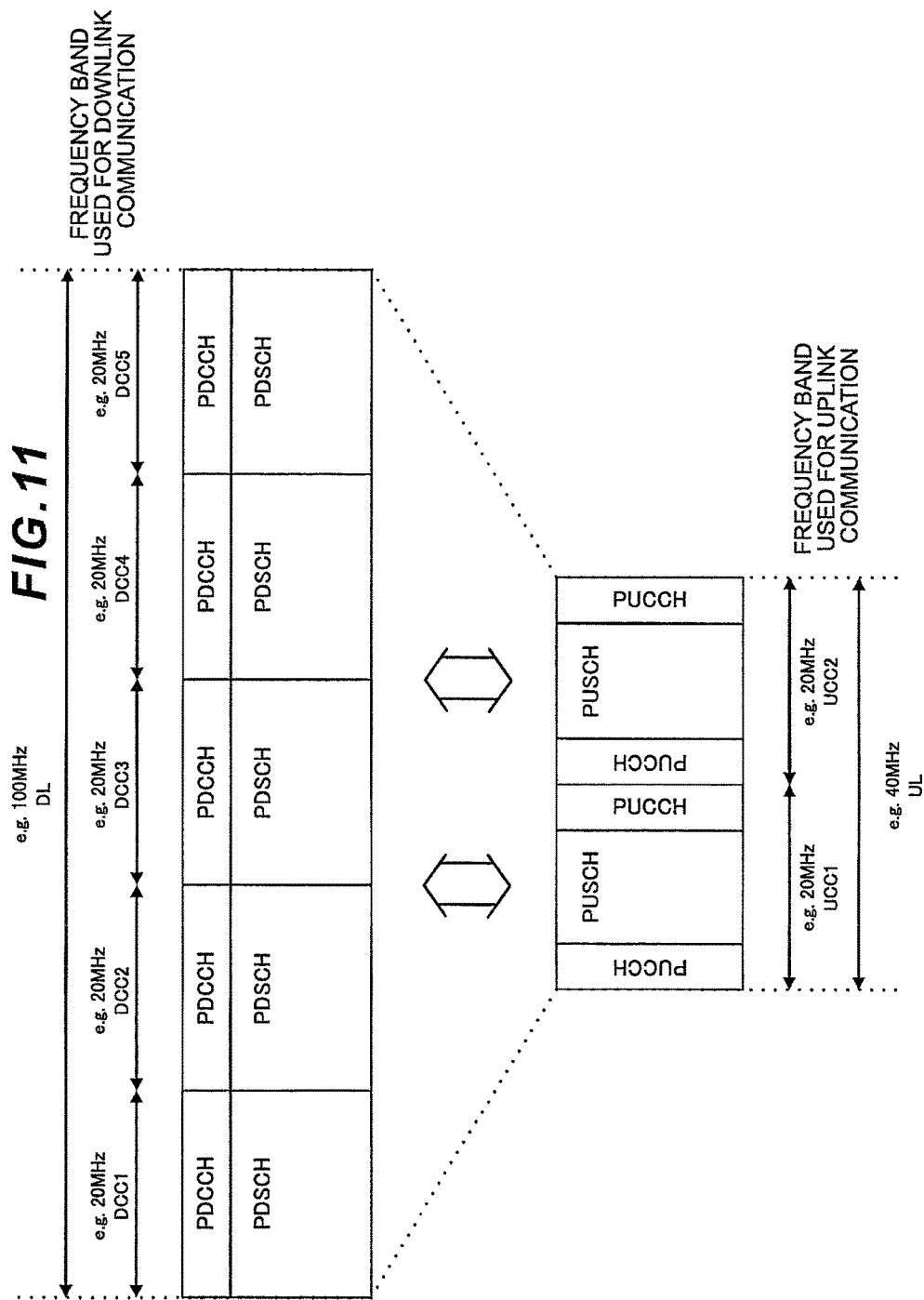

MOBILE STATION APPARATUS AND COMMUNICATION METHOD

This application is a Continuation of application Ser. No. 14/091,312 filed Nov. 26, 2013 which is a Divisional of application Ser. No. 13/387,662 filed on Mar. 30, 2012 (now U.S. Pat. No. 8,619,615 issued on Dec. 31, 2013), and for which priority is claimed under 35 U.S.C. § 120, application Ser. No. 13/387,662 is the national phase of PCT International Application No. PCT/JP2010/062726 filed on Jul. 28, 2010 under 35 U.S.C. § 371, which claims the benefit of priority of JP2009-175973 filed Jul. 29, 2009. The entire contents of each of the above-identified applications are hereby incorporated by reference.

TECHNICAL FIELD

The present invention relates to a mobile station apparatus which communicates with a base station apparatus using a plurality of component carriers and a communication method thereof.

BACKGROUND ART

3GPP (3rd Generation Partnership Project) is a project to study and create specifications of a mobile communication system based on a network evolved from W-CDMA (Wideband-Code Division Multiple Access) and GSM (Global System for Mobile Communications). In 3GPP, W-CDMA has been standardized as the third generation cellular mobile communication system and is being put into service in sequence. In addition, HSDPA (High-speed Downlink Packet Access) with a still higher communication speed has been also standardized and put into service. In 3GPP, consideration is underway with regard to evolution of the third generation radio access technology (referred to as "LTE (Long Term Evolution)" or "EUTRA (Evolved Universal Terrestrial Radio Access)", in the following), and a mobile communication system which realizes data transmission and reception with a higher speed using a wider frequency band (referred to as "LTE-A (Long Term Evolution-Advanced)" or "Advanced-EUTRA", in the following).

OFDMA (Orthogonal Frequency Division Multiple Access) method which realizes user multiplexing using mutually orthogonal subcarriers, and SC-FDMA (Single Carrier-Frequency Division Multiple Access) method are under consideration as the communication method in LTE. In other words, OFDMA method which is a multi-carrier communication method is proposed for a downlink, and SC-FDMA method which is a single-carrier communication method is proposed for an uplink.

As the communication method in LTE-A, on the other hand, it is being considered to introduce OFDMA method for the downlink, and Clustered-SC-FDMA (referred to as Clustered-Single Carrier-Frequency Division Multiple Access, DFT-s-OFDM with Spectrum Division Control, or DFT-precoded OFDM) method in addition to SC-FDMA method, for the uplink. Here, in LTE and LTE-A, SC-FDMA method and Clustered-SC-FDMA method, which are proposed as the uplink communication method, are characteristic in that the PAPR (Peak to Average Power Ratio) when transmitting data (information) can be suppressed to a low level.

In addition, although the frequency band used in a general mobile communication method is contiguous, it is being considered in LTE-A to use a plurality of contiguous and/or discontiguous frequency bands (referred to as "Carrier Component (CC)", or "Component Carrier (CC)", in the following) in a multiple manner to operate them as one frequency band (as referred to as Spectrum aggregation, Carrier aggregation, Frequency aggregation, etc.). Furthermore, it is also proposed to use different frequency band widths for the downlink communication and the uplink communication (Asymmetric carrier aggregation) in order to allow the base station apparatus and the mobile station apparatus to communicate using a wide frequency band in a more flexible manner (see non-patent document 1).

FIG. 10 is an explanatory view illustrating a mobile communication system with the carrier aggregation of the conventional technology. Using the same bandwidth for a frequency band used for the downlink (DL) communication and for a frequency band used for the uplink (UL) communication as shown in FIG. 10 (also referred to as Symmetric carrier aggregation). As shown in FIG. 10, the base station apparatus and the mobile station apparatus can communicate with each other in a wide frequency band including a plurality of carrier components by using a plurality of carrier components which is contiguous and/or discontiguous frequency bands in a multiple manner. FIG. 10 shows that the frequency band used for the downlink communication having a bandwidth of 100 MHz (also referred to as DL system band, or DL system bandwidth, in the following), for example, includes five downlink carrier components (DCC1: Downlink Component Carrier 1, DCC2, DCC3, DCC4 and DCC5) each having a bandwidth of 20 MHz. Additionally, as an example, it is shown that the frequency band used for the uplink communication (also referred to as UL system band, or UL system bandwidth, in the following) having a bandwidth of 100 MHz includes five Uplink Carrier Components (UCC1: Uplink Component Carrier 1, DCC2, DCC3, DCC4 and DCC5) each having a bandwidth of 20 MHz.

In FIG. 10, downlink channels such as a Physical Downlink Control Channel (PDCCH, in the following), a Physical Downlink Shared Channel (PDSCH, in the following) or the like are mapped on each downlink carrier component. The base station apparatus transmits using the PDCCH, to the mobile station apparatus, control information (resource allocation information, MCS (Modulation and Coding Scheme) information, HARQ (Hybrid Automatic Repeat Request) processing information, or the like) for transmitting a downlink transport block to be transmitted using the PDSCH, and transmits the downlink transport block to the mobile station apparatus using the PDSCH. In other words, in FIG. 10, the base station apparatus can transmit up to five downlink transport blocks to the mobile station apparatus in the same subframe.

In addition, uplink channels such as a Physical Uplink Control Channel (PUCCH, in the following), a Physical Uplink Shared Channel (PUSCH, in the following), or the like are mapped on each uplink carrier component. The mobile station apparatus transmits using the PUCCH and/or the PUSCH, to the base station apparatus, Uplink Control Information (UCI, also referred to as UCS: Uplink Control Signaling) such as control information of the HARQ for the PDCCH and/or the downlink transport block, channel state information, or a scheduling request. Here, the control information of the HARQ is information indicating ACK/NACK (Positive Acknowledgement/Negative Acknowledgement, ACK signal or NACK signal) and/or information indicating DTX (Discontinuous Transmission) for the PDCCHs and/or the downlink transport blocks. The information indicating the DTX is information indicating that the mobile station apparatus failed to detect the PDCCH from the base station apparatus. Here, in FIG. 8, there may exist a downlink/uplink carrier component on which any of the downlink/uplink channels such as the PDCCH, the PDSCH, the PUCCH, the PUSCH, or the like is not mapped.

Similarly, FIG. 11 is an explanatory view illustrating a mobile communication system with the Asymmetric carrier aggregation of the conventional technology. As shown in FIG. 11, the base station apparatus and the mobile station apparatus can communicate with each other in a wide frequency band using different bandwidths for a frequency band used for the downlink communication and for a frequency band used for the uplink communication and using carrier components which are contiguous and/or discontiguous frequency bands constituting the frequency bands in a multiple manner. FIG. 11 shows that the frequency band used for the downlink communication having a bandwidth of 100 MHz, for example, includes five downlink carrier components (DCC1, DCC2, DCC3, DCC4 and DCC5) each having a bandwidth of 20 MHz, and that the frequency band used for the uplink communication having a bandwidth of 40 MHz includes two uplink carrier components (UCC1 and DCC2) each having a bandwidth of 20 MHz. In FIG. 11, the downlink/uplink channels are mapped on each downlink/uplink carrier component, and the base station apparatus can transmit a plurality of downlink transport blocks to the mobile station apparatus in the same subframe using a plurality of PDSCHs allocated using a plurality of PDCCHs. In addition, the mobile station apparatus can transmit using the PUCCH and/or the PUSCH, to the base station apparatus, the Uplink Control Information (UCI) such as the control information of the HARQ for the PDCCHs and/or the downlink transport blocks, the channel state information, or the scheduling request.

PRIOR ART DOCUMENTS

Non-patent Document 1: "Initial Access Procedure for Asymmetric Wider Bandwidth in LTE-Advanced", 3GPP TSG RAN WG1 Meeting #55, R1-084249, Nov. 10-14, 2008.

However, there is a problem with the conventional technology that a mobile station apparatus cannot transmit data (information) to the base station apparatus using a plurality of PUCCHs in the same subframe (simultaneous transmission of a plurality of PUCCHs), or transmit data to the base station apparatus using the PUSCH and the PUCCH in the same subframe (simultaneous transmission of the PUSCH and the PUCCH). In LTE-A, on the other hand, the mobile station apparatus can transmit data with a higher transmission power (PAPR) than before, since data transmission is performed using a plurality of uplink carrier components. However, it is also important in LTE-A to suppress the transmission power to some extent when the mobile station apparatus transmits data, and transmission using a plurality of uplink carrier components considering transmission power in the mobile station apparatus is required (it becomes necessary to realize simultaneous transmission of a plurality of PUCCHs and simultaneous transmission of PUSCH and PUCCH considering transmission power in the mobile station apparatus).

DISCLOSURE OF THE INVENTION

It is an object of the present invention, which has been made in view of the above circumstances, to provide a mobile station apparatus and a communication method enabling transmission of data (information) with transmission power in the mobile station apparatus suppressed to a low level when the base station apparatus and the mobile station apparatus communicate with each other in a wide frequency band using carrier components in a multiple manner.

(1) The present invention has taken the following measures to achieve the object. That is, the mobile station apparatus of the present invention is a mobile station apparatus which communicates with a base station apparatus using a plurality of component carriers, wherein the mobile station apparatus transmits uplink control information to the base station apparatus using a single physical uplink control channel in a plurality of uplink component carriers, regardless of whether or not a plurality of physical uplink control channels is allocated by the base station apparatus, and wherein when each physical uplink shared channel in the plurality of uplink component carriers including a first uplink component carrier on which the uplink control information is transmitted using the physical uplink control channel is allocated in the same subframe by the base station apparatus, the mobile station apparatus transmits the uplink control information to the base station apparatus using the physical uplink shared channel in the first uplink component carrier.

(2) In addition, when a physical uplink shared channel in a second uplink component carrier which is different from the first uplink component carrier is allocated by the base station apparatus, the mobile station apparatus of the present invention transmits the uplink control information to the base station apparatus using the physical uplink shared channel in the second uplink component carrier.

(3) In addition, a communication method of the present invention is a communication method of a mobile station apparatus which communicates with a base station apparatus using a plurality of component carriers, wherein the mobile station apparatus transmits uplink control information to the base station apparatus using a single physical uplink control channel in a plurality of uplink component carriers, regardless of whether or not a plurality of physical uplink control channels is allocated by the base station apparatus, and wherein when each physical uplink shared channel in the plurality of uplink component carriers including a first uplink component carrier on which the uplink control information is transmitted using the physical uplink control channel is allocated in the same subframe by the base station apparatus, the mobile station apparatus transmits the uplink control information to the base station apparatus using the physical uplink shared channel in the first uplink component carrier.

(4) In addition, in a communication method of the present invention, when a physical uplink shared channel in a second uplink component carrier which is different from the first uplink component carrier is allocated by the base station apparatus, the mobile station apparatus transmits the uplink control information to the base station apparatus using the physical uplink shared channel in the second uplink component carrier.

According to the present invention, it becomes possible to transmit and receive data (information) with transmit power in the mobile station apparatus suppressed to a low level when the base station apparatus and the mobile station apparatus communicate with each other in a wide frequency band using a plurality of contiguous and/or discontiguous frequency bands (carrier components) in a multiple manner.

BRIEF DESCRIPTION OF THE DRAWINGS

FIG. 1 conceptually illustrates a configuration of a physical channel according to an embodiment of the present invention;

FIG. 2 is a block diagram illustrating a schematic configuration of a base station apparatus according to an embodiment of the present invention;

FIG. 3 is a block diagram illustrating a schematic configuration of a mobile station apparatus according to an embodiment of the present invention;

FIG. 4 illustrates an exemplary mobile communication system to which a first embodiment can be applied;

FIG. 5 illustrates an exemplary mobile communication system to which the first embodiment can be applied;

FIG. 6 illustrates an exemplary mobile communication system to which the first embodiment can be applied;

FIG. 7 is an explanatory view illustrating the operation of a mobile station apparatus when a physical uplink shared channel is assigned;

FIG. 8 is an explanatory view illustrating the operation of a mobile station apparatus when a physical uplink shared channel is assigned;

FIG. 9 is an explanatory view illustrating the operation of a mobile station apparatus when a physical uplink shared channel is assigned;

FIG. 10 illustrates an exemplary spectrum aggregation in the conventional technology; and FIG. 11 illustrates an exemplary asymmetric carrier aggregation in the conventional technology.

BEST MODES FOR CARRYING OUT THE INVENTION

Next, an embodiment according to the present invention will be described, referring to the accompanying drawings. FIG. 1 illustrates an exemplary configuration of a channel in the embodiment of the present invention. A downlink physical channel includes a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH). An uplink physical channel includes a Physical Uplink Shared Channel (PUSCH), a Physical Uplink Control Channel (PUCCH), and a Physical Random Access Channel (PRACH).

The Physical Broadcast Channel (PBCH) performs mapping of the Broadcast Channel (BCH) with a 40-millisecond interval. The timing of 40 milliseconds is blind detected. In other words, no explicit signaling is performed for timing presentation. In addition, a subframe including the Physical Broadcast Channel (PBCH) can be decoded only by that subframe (self-decodable).

The Physical Downlink Control Channel (the PDCCH) is a channel used for assigning a resource of the Physical Downlink Shared Channel (the PDSCH) and notifying (transmitting) the Hybrid Automatic Repeat Request (HARM) information for the downlink data and an uplink transmission permission, which is resource allocation of the Physical Uplink Shared Channel (the PUSCH) to the mobile station apparatus. The PDCCH consists of a plurality of Control Channel Elements (CCE), and the mobile station apparatus receives the PDCCH from the base station apparatus by detecting the PDCCH consists of the CCE. The CCE consists of a plurality of Resource Element Groups (REG, also referred to as mini-CCE) spread in the frequency and time domains. Here, the Resource Element Group is a unit resource consists of one OFDM symbol (time domain) and one subcarrier (frequency domain), and the REG consists of, in a frequency domain in the same OFDM symbol, for example, four downlink resource elements which are contiguous in the frequency domain except for a downlink pilot channel. In addition, for example, one PDCCH consists of one, two, four, and eight CCEs with the numbers identifying the CCEs (CCE indices) being sequential.

The Separate coding for each mobile station apparatus and for each type is applied to PDCCHs. In other words, a mobile station apparatus detects a plurality of PDCCHs and obtains information indicating downlink or uplink resource allocation or other control signals. Each PDCCH has a value of CRC (Cyclic Redundancy Check) that can identify the format provided thereto, and the mobile station apparatus performs CRC on each set of CCE that can be constituted of the PDCCH and obtains a PDCCH that has succeeded in CRC. This is also referred to as blind decoding, and the range of sets of CCE that can be constituted of the PDCCH for which the mobile station apparatus performs the blind decoding is referred to as a Search Space. In other words, the mobile station apparatus performs blind decoding for the CCE in the Search Space to detect the PDCCH.

If resource allocation of the physical downlink shared channel (the PDSCH) is transmitted on the PDCCH, the mobile station apparatus receives data (downlink data (Downlink Shared Channel (DL-SCH)), and/or downlink control data (downlink control information) using the Physical Downlink Shared Channel (the PDSCH), according to the resource allocation specified by the PDCCH from the base station apparatus. In other words, this PDCCH is used for transmitting a signal for assigning resource in the downlink (referred to as a "Downlink Transmission Permission Signal" or "Downlink Grant", in the following). Additionally, if resource allocation of the Physical Uplink Shared Channel (the PUSCH) is transmitted on the PDCCH, the mobile station apparatus transmits data (uplink data (Uplink Shared Channel (UL-SCH)), and/or uplink control data (uplink control information) using the Physical Uplink Shared Channel (the PUSCH), according to the resource allocation specified by the PDCCH from the base station apparatus. In other words, this PDCCH is used for transmitting a signal for permitting data transmission in the uplink (referred to as "uplink transmission permission signal" or "uplink grant", in the following).

The Physical Downlink Shared Channel (PDSCH) is a channel used for transmitting the downlink data (the downlink Shared Channel: the DL-SCH) or paging information (Paging Channel: PCH). The Physical Multicast Channel (PMCH) is a channel used for transmitting a multicast channel (MCH), in which a downlink reference signal, an uplink reference signal, and a physical downlink Synchronization signal are separately allocated.

Here, for example, the transmission of the downlink data (the DL-SCH) indicates transmission of user data, and the DL-SCH is a transport channel. The DL-SCH supports the HARQ and dynamic adaptation Radio Link control, and beam forming is also available therein. The DL-SCH supports dynamic resource allocation and semi-static resource allocation.

The Physical Uplink Shared Channel (PUSCH) is a channel mainly used for transmitting the uplink data (the Uplink Shared Channel: the UL-SCH). Additionally, if the base station apparatus has performed scheduling of the mobile station apparatus, the uplink control (the uplink control signal) is also transmitted using the PUSCH. The uplink control information includes Channel State information CSI (or Channel Statistical Information) indicating the downlink channel state, a downlink Channel Quality Indicator (CQI), a Precoding Matrix Indicator (PMI), a Rank Indication (RI), and the control information of the HARQ for the PDCCH and/or the downlink transport block (information indicating the ACK/NACK and/or information indicating the DTX). Here, the Channel State Information CSI also includes, for example, explicit channel state information (Explicit CSI) indicating exactly the downlink channel state measured by the mobile station apparatus (the mobile station apparatus expresses the measured downlink channel state using a specific factor or the like). The CQI, PMI, RI etc. are also referred to as Implicit Channel State information (Implicit CSI).

Here, for example, the transmission of the uplink data (the UL-SCH) indicates transmission of user data, and the UL-SCH is a transport channel. The UL-SCH supports the HARQ and dynamic adaptation Radio Link control, and beam forming is also available therein. The UL-SCH supports dynamic resource allocation and semi-static resource allocation.

In addition, the uplink data (the UL-SCH) and the downlink data (the DL-SCH) may also include a Radio Resource Control Signal (referred to as "RRC Signaling: Radio Resource Control Signaling", in the following) exchanged between the base station apparatus and the mobile station apparatus, a MAC (Medium Access Control) control element, or the like.

The Physical Uplink Control Channel (PUCCH) is a channel used for transmitting the uplink control information (the uplink control signal). Here, the uplink control information includes, for example, the Channel State Information CSI indicating the downlink channel state, the downlink Channel Quality Indicator CQI, the Pre-coding Matrix Indicator PMI, the Rank Indicator RI, the Scheduling Request (SR) which requests resource allocation for the mobile station apparatus to transmit the uplink data (requesting transmission of the UL-SCH), and the control information of the HARQ for the PDCCH and/or the downlink transport block (information indicating the ACK/NACK and/or information indicating the DTX).

The Physical Control Format Indicator Channel (PCFICH) is a channel used for notifying the mobile station apparatus of the number of OFDM symbols used for the PDCCH and is transmitted in each subframe. The Physical Hybrid ARQ Indicator Channel (PHICH) is a channel used for transmitting an ACK/NACK used for the HARQ of the uplink data. The Physical Random Access Channel (PRACH) is a channel used for transmitting a random access preamble and has a guard time. As shown in FIG. 1, the mobile communication system according to the present embodiment includes a base station apparatus 100 and a mobile station apparatus 200.

[Configuration of the Base Station Apparatus 100]

FIG. 2 is a block diagram illustrating a schematic configuration of the base station apparatus 100 according to the embodiment of the present invention. The base station apparatus 100 includes a data control unit 101, a transmission data modulation unit 102, a wireless unit 103, a scheduling unit 104, a channel estimation unit 105, a received data demodulation unit 106, a data extraction unit 107, an higher layer 108, and an antenna 109. In addition, the wireless unit 103, the scheduling unit 104, the channel estimation unit 105, the received data demodulation unit 106, the data extraction unit 107, the higher layer 108, and the antenna 109 constitute a receiving unit, whereas the data control unit 101, the transmission data modulation unit 102, the wireless unit 103, the scheduling unit 104, the higher layer 108, and the antenna 109 constitute a transmitting unit.

The antenna 109, the wireless unit 103, the channel estimation unit 105, the received data demodulation unit 106, and the data extraction unit 107 perform processing of the uplink physical layer. The antenna 109, the wireless unit 103, transmission data modulation unit 102, and the data control unit 101 perform processing of the downlink physical layer.

The data control unit 101 receives a transport channel from the scheduling unit 104. The data control unit 101 performs mapping of the transport channel, and the signal and channel generated in the physical layer to a physical channel, based on scheduling information input from the scheduling unit 104. Each data mapped as described above is output to the transmission data modulation unit 102.

The transmission data modulation unit 102 modulates the transmitted data into the OFDM format. Based on the scheduling information from the scheduling unit 104 and the modulation scheme and coding scheme corresponding to each PRB, the transmission data modulation unit 102 performs signal processing on the data input from the data control unit 101, such as data modulation, coding, serial/parallel conversion of input signals, IFFT (Inverse Fast Fourier Transform) processing, CP (Cyclic Prefix) insertion, and filtering, generates transmission data, and outputs the data to the wireless unit 103. Here, the scheduling information includes downlink physical resource block PRB (Physical Resource Block) allocation information and physical resource block location information including frequency and time, for example, and the modulation scheme and coding scheme corresponding to each PRB include information such as the modulation scheme of 16QAM and the coding rate of 2/3 coding rate.

The wireless unit 103 generates a radio signal by up-converting the modulated data input from the transmission data modulation unit 102 into radio frequency, and transmits it to the mobile station apparatus 200 via the antenna 109. In addition, the wireless unit 103 receives an uplink radio signal from the mobile station apparatus 200 via the antenna 109, down-converts it into a baseband signal, and outputs the received data to the channel estimation unit 105 and the received data demodulation unit 106.

The scheduling unit 104 performs processing of the Media Access Control (MAC) layer. The scheduling unit 104 performs mapping of a logical channel and the transport channel, scheduling of the downlink and uplink (HARQ processing, selection of the transport format, etc.), or the like. In the scheduling unit 104, in order to control processing units of respective physical layers in an integrative manner, interfaces are provided (although not shown) between the scheduling unit 104 and the antenna 109, the wireless unit 103, the channel estimation unit 105, the received data demodulation unit 106, the data control unit 101, the transmission data modulation unit 102, and the data extraction unit 107.

In the downlink scheduling, the scheduling unit 104 performs selection of the downlink transport format (transmission format, i.e., allocation of physical resource blocks, the modulation scheme and coding scheme, or the like) for modulating each data, re-transmission control in HARQ, and generation scheduling information used for the downlink, based on the feedback information received from the mobile station apparatus 200 (uplink channel state information (CSI, CQI, PMI, RI), or ACK/NACK information for downlink data, etc.), available PRB information of each mobile station apparatus 200, buffer status, scheduling information input from the higher layer 108, or the like. The scheduling information used for the downlink scheduling is output to the data control unit 101.

Additionally, in the uplink scheduling, the scheduling unit 104 generates scheduling information used for selection of the uplink transport format (transmission form, i.e., allocation of physical resource blocks, modulation scheme and coding scheme, etc.) for modulating each data and uplink scheduling, based on the estimation result of the uplink channel state (radio channel state) output by the channel estimation unit 105, a resource allocation request from the mobile station apparatus 200, available PRB information of each mobile station apparatus 200, the scheduling information input from the higher layer 108, or the like. The scheduling information used for uplink scheduling is output to the data control unit 101.

In addition, the scheduling unit 104 performs mapping of the downlink logical channel input from the higher layer 108 to the transport channel and outputs the result to the data control unit 101. Additionally, after having processed as necessary the control data and the transport channel input from the data extraction unit 107 and obtained in the uplink, the scheduling unit 104 maps them to the uplink logical channel, and outputs the result to the higher layer 108.

The channel estimation unit 105 estimates the uplink channel state from an uplink Demodulation Reference Signal (DRS) in order to demodulate the uplink data, and outputs the estimation result to the received data demodulation unit 106. Additionally, in order to perform uplink scheduling, the channel estimation unit 105 estimates the uplink channel state from an uplink Sounding Reference Signal (SRS), and outputs the estimation result to the scheduling unit 104.

The received data demodulation unit 106 also serves as an OFDM demodulation unit and/or a DFT-Spread-OFDM (DFT-S-OFDM) demodulation unit which demodulates the received data which has been modulated in the OFDM system and/or the SC-FDMA system. Based on the uplink channel state estimation result input from the channel estimation unit 105, the received data demodulation unit 106 performs signal processing on the modulated data input from the wireless unit 103, such as DFT conversion, subcarrier mapping, IFFT conversion, filtering, or the like, performs demodulation processing, and outputs the result to the data extraction unit 107.

The data extraction unit 107 checks whether or not the data input from the received data demodulation unit 106 is correct and outputs the check result (affirmation signal ACK/negation signal NACK) to the scheduling unit 104. In addition, the data extraction unit 107 separates the transport channel and the control data of the physical layer from the data input from the received data demodulation unit 106, and outputs them to the scheduling unit 104. The separated control data includes the Channel State Information CSI notified from the mobile station apparatus 200, the downlink Channel Quality Indicator CQI, the Pre-coding Matrix Indicator PMI, the Rank Indicator RI, the control information in the HARQ, the scheduling request, or the like.

The higher layer 108 performs processing of the Packet Data Convergence Protocol (PDCP) layer, the Radio Link Control (RLC) layer, and the Radio Resource Control (RRC) layer. In order to control the processing units of lower layers in an integrative manner, in the scheduling unit 104, interfaces (although not shown) are provided between the higher layer 108 and the scheduling unit 104, the antenna 109, the wireless unit 103, the channel estimation unit 105, the received data demodulation unit 106, the data control unit 101, the transmission data modulation unit 102, and the data extraction unit 107.

The higher layer 108 has a radio resource control unit 110 (also referred to as a control unit). In addition, the radio resource control unit 110 performs management of various setting information, management of system information, paging control, management of the communication status of each mobile station apparatus 200, mobility management such as hand over, management of the buffer status for each mobile station apparatus 200, management of connection setting of unicast and multicast bearers, management of mobile station identifiers (UEID), or the like. The higher layer 108 exchanges information with another base station apparatus 100 and exchanges information with upper nodes.

[Configuration of the Mobile Station Apparatus 200]

FIG. 3 is a block diagram illustrating a schematic configuration of the mobile station apparatus 200 according to the embodiment of the present invention. The mobile station apparatus 200 includes a data control unit 201, a transmission data modulation unit 202, a wireless unit 203, a scheduling unit 204, a channel estimation unit 205, a received data demodulation unit 206, a data extraction unit 207, an higher layer 208, and an antenna 209. In addition, the data control unit 201, the transmission data modulation unit 202, the wireless unit 203, the scheduling unit 204, the higher layer 208, and the antenna 209 constitute a transmitting unit, whereas the wireless unit 203, the scheduling unit 204, the channel estimation unit 205, the received data demodulation unit 206, the data extraction unit 207, the higher layer 208, and the antenna 209 constitute a receiving unit.

The data control unit 201, the transmission data modulation unit 202, and the wireless unit 203 perform processing of the uplink physical layer. The wireless unit 203, the channel estimation unit 205, the received data demodulation unit 206, and the data extraction unit 207 perform processing of the downlink physical layer.

The data control unit 201 receives a transport channel from the scheduling unit 204. The data control unit 201 performs mapping of the transport channel, and the signal and channel generated in the physical layer to a physical channel, based on scheduling information input from the scheduling unit 204. Each data mapped as described above is output to the transmission data modulation unit 202.

The transmission data modulation unit 202 modulates the transmitted data into the OFDM system and/or SC-FDMA system. The transmission data modulation unit 202 performs signal processing on the data input from the data control unit 201, such as data modulation, DFT (discrete Fourier transform) processing, subcarrier mapping, IFFT (Inverse Fast Fourier transform) processing, CP insertion, and filtering, generates transmission data, and outputs the data to the wireless unit 203.

The wireless unit 203 generates a radio signal by up-converting the modulated data input from the transmission data modulation unit 202 into radio frequency, and transmits it to the base station apparatus 100 via the antenna 209. In addition, the wireless unit 203 receives a radio signal which has been modulated using downlink data from the base station apparatus 100 via the antenna 209, down-converts it into a baseband signal, and outputs the received data to the channel estimation unit 205 and the received data demodulation unit 206.

The scheduling unit 204 performs processing of the Medium Access Control (MAC) layer. The scheduling unit 204 performs mapping of a logical channel and the transport channel, scheduling of the downlink and uplink (HARQ processing, selection of the transport format, etc.), or the like. In order to control the processing units of respective physical layers in an integrative manner, in the scheduling unit 204, interfaces (although not shown) are provided between the scheduling unit 204 and the antenna 209, the data control unit 201, the transmission data modulation unit 202, the channel estimation unit 205, the received data demodulation unit 206, the data extraction unit 207 and the wireless unit 203.

In the downlink scheduling, the scheduling unit 204 generates scheduling information used for reception control of the transport channel, physical signal and physical channel, HARQ re-transmission control, and downlink scheduling, based on the scheduling information (transport format or HARQ re-transmission information) from the base station apparatus 100 or the higher layer 208, or the like. The scheduling information used for downlink scheduling is output to the data control unit 201.

In the uplink scheduling, the scheduling unit 204 generates scheduling information used for scheduling processing for mapping the uplink logical channel input from the higher layer 208 to the transport channel, and uplink scheduling, based on the uplink buffer status input from the higher layer 208, the uplink scheduling information (transport format, HARQ re-transmission information, etc.) from the base station apparatus 100 input from the data extraction unit 207, and the scheduling information input from the higher layer 208. For the uplink transport format, the information notified from the base station apparatus 100 is used. The scheduling information is output to the data control unit 201.

In addition, the scheduling unit 204 performs mapping of the uplink logical channel input from the higher layer 208 to the transport channel and outputs the result to the data control unit 201. Additionally, the scheduling unit 204 also outputs, to the data control unit 201, downlink channel state information CSI input from the channel estimation unit 205, the downlink Channel Quality Indicator CQI, the Pre-coding Matrix Indicator PMI, the Rank Indicator RI, and the check result of the CRC check input from the data extraction unit 207. In addition, after having processed as necessary the control data and the transport channel obtained in the downlink input from the data extraction unit 207, the scheduling unit 204 maps them to the downlink logical channel, and outputs the result to the higher layer 208.

The channel estimation unit 205 estimates the downlink channel state from an downlink Reference Signal (RS) in order to demodulate the downlink data, and outputs the estimation result to the received data demodulation unit 206. In addition, the channel estimation unit 205 estimates the downlink channel state from the downlink Reference Signal (RS) in order to notify the base station apparatus 100 of the estimation result of the downlink channel state (radio channel state), and outputs the estimation result to the scheduling unit 204, as downlink channel state information CSI, the downlink Channel Quality Indicator CQ, the Pre-coding Matrix Indicator PMI, and the Rank Indicator RI.

The received data demodulation unit 206 performs demodulation processing on the received data which has been modulated into the OFDM system. The received data demodulation unit 206 demodulates the modulated data input from the wireless unit 203, based on the downlink channel state estimation result input from the channel estimation unit 205, and outputs the data to the data extraction unit 207.

The data extraction unit 207 performs a CRC check on the data input from the received data demodulation unit 206 to check whether or not the data is correct, and outputs the check result (positive acknowledge ACK/negative acknowledge NACK) to the scheduling unit 204. In addition, the data extraction unit 207 separates the transport channel and the control data of the physical layer from the data input from the received data demodulation unit 206, and outputs them to the scheduling unit 204. The separated control data includes scheduling information such as downlink or uplink resource allocation, uplink HARQ control information, or the like.

The higher layer 208 performs processing of the Packet Data Convergence Protocol (PDCP) layer, the Radio Link Control (RLC) layer, and the Radio Resource Control (RRC) layer. In order to control the processing units of lower layers in an integrative manner, in the higher layer 208, interfaces (although not shown) are provided between the higher layer 208 and the scheduling unit 204, the antenna 209, the data control unit 201, the transmission data modulation unit 202, the channel estimation unit 205, the received data demodulation unit 206, the data extraction unit 207, and the wireless unit 203.

The higher layer 208 has a radio resource control unit 210 (also referred to as a control unit). The radio resource control unit 210 performs management of various setting information, management of system information, paging control, management of its own communication status, mobility management such as hand over, management of buffer status, management of connection setting of unicast and multicast bearers, and management of mobile station identifiers (UEID).

First Embodiment

Next, a first embodiment of a mobile communication system using the base station apparatus 100 and the mobile station apparatus 200 will be described. In the first embodiment, the base station apparatus 100 transmits information for indicating that the mobile station apparatus 200 transmits the uplink control information using a single physical uplink control channel (PUCCH) in a specific one uplink carrier component or a plurality of uplink carrier components, and the mobile station apparatus 200, upon receiving the information from the base station apparatus 100, transmits the uplink control information using the single PUCCH, even if a plurality of PUCCHs is assigned in the specific one uplink carrier component or the plurality of uplink carrier components specified by the base station apparatus 100. In other words, the uplink control information is transmitted using the single PUCCH, regardless of whether or not the plurality of PUCCHs is assigned in the specific one uplink carrier component or the plurality of uplink carrier components specified by the base station apparatus 100.

Furthermore, if the physical uplink shared channel (PUSCH) of the specific one uplink carrier component or the plurality of uplink carrier components specified by the base station apparatus 100 is assigned, the mobile station apparatus 200 transmits the uplink control information using the assigned PUSCH, when transmitting the uplink control information using the single PUCCH.

Here, for example, the base station apparatus 100 can transmit, to the mobile station apparatus 200, the information for indicating that the mobile station apparatus 200 transmits the uplink control information using the single PUCCH in the specific one uplink carrier component or the plurality of uplink carrier components, the information being included in the Radio Resource Control Signal (RRC signaling).

In addition, the mobile station apparatus 200 can transmit, to the base station apparatus 100, the channel state information (CSI) indicating the downlink channel state as the uplink control information. In addition, the mobile station apparatus 200 can transmit, to the base station apparatus 100, the Scheduling Request (SR) as the uplink control information, to request resource allocation for transmitting the uplink data. In addition, the mobile station apparatus 200 can transmit, to the base station apparatus 100, the Channel Quality Indicator (CQI) as the uplink control information. In addition, the mobile station apparatus 200 can transmit, to the base station apparatus 100, the Rank Indication (RI) as the uplink control information. In addition, the mobile station apparatus 200 can transmit, to the base station apparatus 100, the Pre-coding Matrix Indicator (PMI) as the uplink control information. In addition, the mobile station apparatus 200 can transmit, to the base station apparatus 100, the control information (the control signal) of the HARQ for the PDCCHs and/or the downlink transport blocks as the uplink control information.

In other words, the mobile station apparatus 200 can transmit, to the base station apparatus 100 as the uplink control information, the control information of the HARQ for the PDCCHs and/or the downlink transport blocks to be transmitted using the resources dynamically allocated by the base station apparatus 100. In addition, the mobile station apparatus 200 can transmit, to the base station apparatus 100 as the uplink control information, the control information of the HARQ for the downlink transport blocks to be transmitted using the resources persistently allocated by the base station apparatus 100. Here, the control information of the HARQ refers to the information indicating the ACK/NACKs for the PDCCHs and/or the downlink transport blocks and the information indicating the DTX. The information indicating the DTX refers to information indicating that the mobile station apparatus 200 failed to detect the PDCCH from the base station apparatus 100.

In the present embodiment, the PUCCH persistently (enduringly, periodically) allocated by the base station apparatus 100 indicates, for example, the PUCCH (also referred to as persistently allocated PUCCH) which is allocated by the RRC signaling from the base station apparatus 100 with an interval of about 100 ms, and the base station apparatus 100 and the mobile station apparatus 200 maintain the allocated PUCCH for a certain period (e.g., a period of about 100 ms), and transmits and receives data using the allocated PUCCH. On the other hand, the PUCCH dynamically allocated by the base station apparatus 100 indicates, for example, the PUCCH (also referred to as dynamically allocated PUCCH) which is allocated in association with the PDCCH from the base station apparatus 100 with an interval of about 1 ms.

In the following description of the present embodiment, although the frequency band is defined on the basis of bandwidth (Hz), it may be defined by the number of resource blocks (RB) consist of frequency and time. The carrier component in the present embodiment indicates a (narrow) frequency band used in a multiple manner when the base station apparatus 100 and the mobile station apparatus 200 communicate with each other in a mobile communication system having a (wide) system band (frequency band). The base station apparatus 100 and the mobile station apparatus 200 can realize high-speed data communication (transmission and reception of information) by aggregating a plurality of carrier components (e.g., five frequency bands each having a bandwidth of 20 MHz) to form a (wide) system band (e.g., a DL system band/UL system band having a bandwidth of 100 MHz) and using these carrier components in a multiple manner.

A carrier component indicates each (narrow) frequency band (e.g., a frequency band having a bandwidth of 20 MHz) constituting this (wide) system band (e.g., a DL system band/UL system band having a bandwidth of 100 MHz). In other words, the downlink carrier component has a part of the bandwidth in the frequency band available when the base station apparatus 100 and the mobile station apparatus 200 transmit and receive downlink information, whereas the uplink carrier component has a part of the bandwidth in the frequency band available when the base station apparatus 100 and the mobile station apparatus 200 transmit and receive uplink information. In addition, the carrier component may be defined as a unit of composing a particular physical channel (e.g., the PDCCH, the PUCCH, or the like).

In addition, the carrier component may be mapped on a contiguous frequency band or may be mapped on a discontinuous frequency band, and the base station apparatus 100 and the mobile station apparatus 200 can realize high-speed data communication (transmission and reception of information) by aggregating a plurality of carrier components which is contiguous and/or discontinuous frequency bands to form a (wide) system band using these carrier components in a multiple manner. Furthermore, the downlink frequency band and the uplink frequency band formed by the carrier components need not have the same bandwidth, and thus the base station apparatus 100 and the mobile station apparatus 200 can communicate with each other using a downlink frequency band and an uplink frequency band having different bandwidths formed by the carrier component (the Asymmetric carrier aggregation described above).

FIG. 4 illustrates an exemplary mobile communication system to which the first embodiment can be applied. In the following, although the first embodiment describes a mobile communication system which has been subject to the Symmetric carrier aggregation as shown in FIG. 4, the present embodiment can also be applied to a mobile communication system which has been subject to the Asymmetric carrier aggregation. As an example to explain the present embodiment, FIG. 4 shows that the frequency band used for the downlink communication having a bandwidth of 40 MHz consists of three downlink carrier components, namely, two downlink carrier components (DCC1, DCC2) each having a bandwidth of 10 MHz and one downlink carrier component (DCC3) having a bandwidth of 20 MHz.

Additionally, as an example, it is shown that the frequency band used for the uplink communication having a bandwidth of 40 MHz consists of three uplink carrier components, namely, two uplink carrier components (UCC1 and DCC2) each having a bandwidth of 10 MHz and one uplink carrier component (DCC3) having a bandwidth of 20 MHz. In FIG. 4, the downlink/uplink channel such as the PDCCH, the PDSCH, the PUCCH, the PUSCH, or the like are mapped on each of the downlink/uplink carrier components (there may exist a downlink/uplink carrier component on which one of the downlink/uplink channels such as the PDCCH, the PDSCH, the PUCCH, the PUSCH, or the like is not mapped). Here, although the bandwidth of the downlink/uplink carrier components in FIG. 4 is assumed to be 10 MHz and 20 MHz, respectively, as an example, the bandwidth of the downlink/uplink carrier component may be any bandwidth.

In FIG. 4, the base station apparatus 100 can assign the PUCCH for the mobile station apparatus 200 to transmit the uplink control information. For example, the base station apparatus 100 can persistently (enduringly, periodically) assign the PUCCH using the RRC signaling for the mobile station apparatus 200 to transmit the channel state information or the scheduling request (the PUCCH can be persistently assigned to the mobile station apparatus 200). FIG. 4 shows that the base station apparatus 100 assigns the PUCCH of the UCC3 (the PUCCH indicated by the horizontal line) for the mobile station apparatus 200 to transmit the channel state information or the scheduling request, using the RRC signaling.

In addition, for example, the base station apparatus 100 can assign, in association with the PDCCH, the PUCCH for the mobile station apparatus 200 to transmit the uplink control information. For example, the base station apparatus 100 can dynamically assign, in association with the PDCCH, the PUCCH for the mobile station apparatus 200 to transmit the control information of the HARQ for the PDCCHs and/or the downlink transport blocks (the PUCCH can be dynamically assigned to the mobile station apparatus 200). In other words, the base station apparatus 100 can assign (indicate) the PUCCH to the mobile station apparatus 200 in association with the position in the PDCCH resource (PDCCH resource region) of the PDCCH mapped on the downlink carrier component. According to how the PDCCH mapped on the downlink carrier component is set in the PDCCH resource (the PDCCH resource region), the mobile station apparatus 200 maps the uplink control information on the PUCCH in the PUCCH resource (PUCCH resource region), and transmits it to the base station apparatus 100.

Here, correspondence between each PDCCH mapped on the downlink carrier component and each PUCCH mapped on the uplink carrier component can be defined by associating, for example, the first CCE index of the CCEs constituting each PDCCH and the index of each PUCCH (it is shown in FIG. 4 that there are correspondence between the first CCE index of the CCEs constituting the PDCCH indicated by diagonal lines and the index of the PUCCH indicated by diagonal lines, between the first CCE index of the CCEs constituting the PDCCH indicated by grid lines and the index of the PUCCH indicated by grid lines, and between the first CCE index of the CCEs constituting the PDCCH indicated by meshed lines and the index of the PUCCH indicated by meshed lines).

Here, although it is exemplified in FIG. 4 that one PDCCH is mapped on each one of the downlink carrier components here, a plurality of PDCCHs may be mapped on each one of the downlink carrier components. In addition, although it is exemplified in FIG. 4 that the PDCCH is used to assign the PDSCH mapped on the same carrier component as the downlink carrier component on which the PDCCH is mapped, the PDCCH may be used to assign the PDSCH mapped on a carrier component which is different from the downlink carrier component on which the PDCCH is mapped (for example, the PDCCH mapped on the DCC1 may be used to assign the PDSCH mapped on the DCC3).

In addition, the PDCCH can be used to assign the PUSCH mapped on the uplink carrier component corresponding to the downlink carrier component on which the PDCCH is mapped, or can be used to assign the PUSCH mapped on an uplink carrier component which is different from the uplink carrier component corresponding to the downlink carrier component on which the PDCCH is mapped (for example, the PDCCH mapped on the DCC1 may be used to assign the PUSCH mapped on the UCC1, or the PDCCH mapped on the DCC1 may be used to assign the PUSCH mapped on the DCC3).

In FIG. 4, the base station apparatus 100 assigns a plurality of PDSCHs in the same subframe using a plurality of PDCCHs, and transmits, to the mobile station apparatus 200, the control information for transmitting a plurality of downlink transport blocks (resource allocation information, MCS information, HARQ processing information, or the like). Furthermore, the base station apparatus 100 transmits the plurality of downlink transport blocks to the mobile station apparatus 200 in the same subframe using the plurality of PDSCHs. For example, the base station apparatus 100 can assign the PDSCH to be mapped on the DCC1 using the PDCCH mapped on the DCC1 (PDCCH indicated by diagonal lines), assign the PDSCH to be mapped on the DCC2 using the PDCCH mapped on the DCC2 (PDCCH indicated by grid lines), and assign the PDSCH to be mapped on the DCC3 using the PDCCH mapped on the DCC3 (PDCCH indicated by meshed lines). Furthermore, the base station apparatus 100 can transmit the downlink transport blocks to the mobile station apparatus 200 in the same subframe using (up to three) PDSCHs mapped on the DCC1, DCC2, and DCC3.

In FIG. 4, the mobile station apparatus 200 transmits the uplink control information to the base station apparatus 100 using the PUCCH and/or the PUSCH assigned by the base station apparatus 100. For example, the mobile station apparatus 200 can periodically transmit the downlink channel state information using the PUCCH assigned by the base station apparatus 100. In addition, for example, the mobile station apparatus 200 can periodically transmit the CQI, the PMI, and the RI using the PUCCH assigned by the base station apparatus 100. Additionally, for example, the mobile station apparatus 200 can transmit, using the PUCCH assigned by the base station apparatus 100, the scheduling request when requesting resource allocation for transmitting the uplink data. Furthermore, the mobile station apparatus 200 can transmit, using the PUCCH assigned by the base station apparatus 100, the control information of the HARQ for the plurality of PDCCHs and/or the plurality of downlink transport blocks to be transmitted in the same subframe (also referred to as control information of the HARQ, in the following). Here, the control information of the HARQ also includes control information of the HARQ for one PDCCH and/or one downlink transport block.

Here, when transmitting the control information of the HARQ for the plurality of PDCCHs and/or the plurality of downlink transport blocks which are to be transmitted in the same subframe, the mobile station apparatus 200 can transmit such information to the base station apparatus 100 in a bundled manner, or in a multiplexed (using a plurality of bits) manner. In other words, when transmitting the control information of the HARQ for the plurality of PDCCHs and/or the plurality of downlink transport blocks in a bundled manner, the mobile station apparatus 200 can calculate (generate) single control information of the HARQ from the control information of the HARQ for each of the plurality of PDCCHs and/or the plurality of downlink transport blocks, and transmit the calculated (generated) single control information of the HARQ to the base station apparatus 100. For example, the mobile station apparatus 200 can calculate a logical sum from information indicating the ACK/NACK of the HARQ for each of the plurality of PDCCHs and/or the plurality of downlink transport blocks, and transmit it to the base station apparatus 100 as the single information indicating the ACK/NACK.

In addition, when transmitting the control information of the HARQ for the plurality of PDCCHs and/or the plurality of downlink transport blocks in a multiplexed manner (using a plurality of bits), the mobile station apparatus 200 can transmit, to the base station apparatus 100, the control information of the HARQ for each of the plurality of PDCCHs and/or the plurality of downlink transport blocks using a plurality of pieces of control information expressing all the combinations (the information necessary to express all the combinations can also be transmitted using the plurality of pieces of control information in the following). For example, the mobile station apparatus 200 can express all the combinations of information indicating the DTX/ACK/NACK for the plurality of PDCCHs and/or the plurality of downlink transport blocks using a plurality of bits and transmit them to the base station apparatus 100.

Here, when transmitting the uplink control information in a bundled or multiplexed manner, the mobile station apparatus 200 can select (use) any one PUCCH from the plurality of PUCCHs assigned by the base station apparatus 100, and transmit it to the base station apparatus 100 (for example, any one PUCCH can be selected from the plurality of PUCCHs, and one or two bits of information can be transmitted to the base station apparatus 100). In other words, the mobile station apparatus 200 can further transmit a few more bits of information to the base station apparatus 100, depending on which PUCCH, among the plurality of PUCCHs defined according to how the PDCCHs are set in the PDCCH resource (the PDCCH resource region), is used for transmitting the uplink control information (a few more bits of information can be transmitted to the base station apparatus 100, depending on which PUCCH in the region where PUCCHs can be allocated is used for transmitting the uplink control information). For example, if each of three PUCCHs can transmit two bits of information (four types of information), the mobile station apparatus 200 can transmit a total of twelve types of information to the base station apparatus 100, depending on which PUCCH of the three PUCCHs is used (performing channel selection from the three PUCCHs).

In FIG. 4, the base station apparatus 100 can transmit the information for indicating that the mobile station apparatus 200 transmits the uplink control information using the single PUCCH in the specific one uplink carrier component or the plurality of uplink carrier components. For example, the base station apparatus 100 can transmit, to the mobile station apparatus 200, the information for indicating transmission of the uplink control information using the single PUCCH in the plurality of uplink carrier components (the UCC1 and the UCC2), and the information being included in the RRC signaling. In other words, the base station apparatus 100 can indicate, to the mobile station apparatus 200, the specific one uplink carrier component or the plurality of uplink carrier components for transmitting the uplink control information using the single PUCCH.

The mobile station apparatus 200 which has been received this information from the base station apparatus 100, transmits the uplink control information using the single PUCCH in the specified uplink carrier components, even if a plurality of PUCCHs is assigned in the uplink carrier components specified by the base station apparatus 100 (even if a plurality of pieces of uplink control information is being transmitted in the uplink carrier components specified by the base station apparatus 100). In FIG. 4, for example, the mobile station apparatus 200, which has been instructed by the base station apparatus 100 to transmit the uplink control information using the single PUCCH in the UCC1 and the UCC2, transmits the uplink control information to the base station apparatus 100 using the single PUCCH, even if the plurality of PUCCHs is assigned in the UCC1 and the UCC2 (even if the PUCCH indicated by diagonal lines and the PUCCH indicated by grid lines are assigned in the UCC1 and the UCC2).

For example, the mobile station apparatus 200 can transmit the control information of the HARQ for the plurality of PDCCHs and/or the plurality of downlink transport blocks (also referred to as control information of the HARQ, in the following) to the base station apparatus 100 using the single PUCCH (selecting the single PUCCH from the plurality of PUCCHs) in the uplink carrier components (the UCC1 and the UCC2) specified by the base station apparatus 100, in a bundled or multiplexed manner. In the present embodiment, the control information of the HARQ for the plurality of PDCCHs and/or the plurality of downlink transport blocks also includes the control information of the HARQ for one PDCCH and/or one downlink transport block.

Similarly, in FIG. 4, the base station apparatus 100 can transmit, to the mobile station apparatus 200, the information for indicating transmission of the uplink control information using the single PUCCH in the specific one uplink carrier component (UCC3), the information being included in the RRC signaling. The mobile station apparatus 200 which has been received this information from the base station apparatus 100, transmits the uplink control information using the single PUCCH in the specified uplink carrier component, even if the plurality of PUCCHs is assigned in the uplink carrier component specified by the base station apparatus 100 (even if the plurality of pieces of uplink control information is being transmitted in the uplink carrier component specified by the base station apparatus 100). In FIG. 4, for example, the mobile station apparatus 200 which has been instructed by the base station apparatus 100 to transmit the uplink control information using the single PUCCH in the UCC3, transmits the uplink control information to the base station apparatus 100 using the single PUCCH, even if the plurality of PUCCHs is assigned in the UCC3 (even if the PUCCH indicated by horizontal lines and the PUCCH indicated by meshed lines are assigned in the UCC3).

For example, the mobile station apparatus 200 can transmit, in the uplink carrier component (UCC3) specified by the base station apparatus 100, the channel state information and/or the control information of the HARQ to the base station apparatus 100 using the single PUCCH. Similarly, for example, the mobile station apparatus 200 can transmit, in the uplink carrier component (UCC3) specified by the base station apparatus 100, the scheduling request and/or the control information of the HARQ to the base station apparatus 100 using the single PUCCH.

Here, although it is exemplified in FIG. 4 that the base station apparatus 100 assigns the PUCCH of the UCC1 dynamically, the PUCCH of the UCC2 dynamically, and the PUCCH of the UCC3 persistently/dynamically, it is needless to say that the base station apparatus 100 can assign the PUCCH of the UCC1 persistently/dynamically, the PUCCH of the UCC2 persistently/dynamically, and the PUCCH of the UCC3 persistently/dynamically. In other words, the base station apparatus 100 can assign the plurality of PUCCHs of the UCC1, the plurality of PUCCHs of the UCC2, and the plurality of PUCCHs of the UCC3. In FIG. 4, the base station apparatus 100 and the mobile station apparatus 200 can perform an operation similar to the operation described above in either uplink carrier components.

FIG. 5 illustrates an operation of the mobile station apparatus 200 instructed by the base station apparatus 100 to transmit the uplink control information using the single PUCCH in the specific one uplink carrier component or the plurality of uplink carrier components. As has been described above, for example, the base station apparatus 100 can instruct the mobile station apparatus 200 to transmit the uplink control information using the single PUCCH in the plurality of uplink carrier components (the UCC1 and the UCC2). In addition, the mobile station apparatus 200 which has been received this information, can transmit the uplink control information using the single PUCCH (PUCCH indicated by diagonal lines) (even if the plurality of PUCCHs is assigned in the plurality of uplink carrier components (the UCC1 and the UCC2) specified by the base station apparatus 100).

In FIG. 5, the base station apparatus 100 assigns, using the RRC signaling and/or the PDCCH, the plurality of PUCCHs of the UCC3 (PUCCHs indicated by horizontal lines and meshed lines) for transmission of the uplink control information by the mobile station apparatus 200. For example, the base station apparatus 100 assigns, to the same subframe, the PUCCH of the UCC3 (PUCCH indicated by horizontal lines) using the RRC signaling, and the PUCCH of the UCC3 (PUCCH indicated by meshed lines) in association with the PDCCH. The mobile station apparatus 200 transmits the uplink control information using the plurality of PUCCHs of the UCC3 assigned by the base station apparatus 100.

In other words, in FIG. 5, the mobile station apparatus 200 can perform transmission of the uplink control information using single PUCCH on the uplink carrier components (the UCC1 and the UCC2) specified by the base station apparatus 100 and transmission of the uplink control information using the plurality of PUCCHs (on the UCC3) in the same subframe (can perform simultaneous transmission). As shown in FIG. 5, for example, the mobile station apparatus 200 can transmit the control information of the HARQ using the single PUCCH of the UCC1 and the UCC2 (PUCCH indicated by diagonal lines), and the channel state information and/or the control information of the HARQ using the plurality of PUCCHs of the UCC3 (PUCCHs indicated by horizontal lines and the PUCCHs indicated by meshed lines in the same subframe. In this occasion, the mobile station apparatus 200 transmits the control information of the HARQ to the base station apparatus 100 in a bundled or multiplexed manner, using the single PUCCH (PUCCH indicated by diagonal lines), in the uplink carrier components (UCC1 and UCC2) specified by the base station apparatus 100.

Here, in FIG. 5, a Power Amplifier (PA) mounted on the mobile station apparatus 200 will be described. In FIG. 5, for example, the mobile station apparatus 200 can use a single PA for transmitting the data (the information) on the UCC1 and the UCC2. For example, the mobile station apparatus 200 can use in the UCC1 and the UCC2, the single PA with an output power of 23 dBm (or two PAs with an output power of 20 dBm, or four PAs with an output power of 17 dBm) to transmit the data (the information). In addition, the mobile station apparatus 200 can use the single PA for transmitting the data on the UCC3. For example, the mobile station apparatus 200 can use in the UCC3, the single PA with an output power of 23 dBm (or two PAs with an output power of 20 dBm, or four PAs with an output power of 17 dBm) to transmit the data.

In other words, the base station apparatus can transmit, to the mobile station apparatus 200, the information for indicating transmission of the uplink control information using the single PUCCH in the specific one uplink carrier component or the plurality of uplink carrier components, considering the PA mounted on the mobile station apparatus 200 (depending on the status of the mobile station apparatus 200). In other words, the base station apparatus can instruct the mobile station apparatus 200 to transmit the uplink control information using the single PUCCH in the specific one carrier component or the plurality of uplink carrier components on which the mobile station apparatus 200 transmits the data using a set of PAs (one PA with an output power of 23 dBm, two PAs with an output power of 20 dBm, or four PAs with an output power of 17 dBm).

Accordingly, it becomes possible for the base station apparatus 100 to restrict transmission of the uplink control information by the mobile station apparatus 200 using the plurality of PUCCHs with the set of PAs (one PA with an output power of 23 dBm, two PAs with an output power of 20 dBm, or four PAs with an output power of 17 dBm), and thus can transmit the data with transmission power in the mobile station apparatus 200 suppressed to a low level (the data transmission exceeding the maximum output power of the PA mounted on the mobile station apparatus 200 can be avoided). In addition, it becomes possible for the base station apparatus 100 to maintain the single carrier communication method (single carrier characteristic) in the set of PAs, and thus can transmit the data with transmission power in the mobile station apparatus 200 suppressed to a low level (the data transmission exceeding the maximum output power of the PA mounted on the mobile station apparatus 200 can be avoided).

Similarly, FIG. 6 illustrates the operation of the mobile station apparatus 200 instructed by the base station apparatus 100 to transmit the uplink control information using the single PUCCH in the specific one uplink carrier component or the plurality of uplink carrier components. As shown in FIG. 6, the mobile station apparatus 200 which has been received, from the base station apparatus 100, the information for indicating transmission of the uplink control information using the single PUCCH in the specific one uplink carrier component (UCC3), transmits the uplink control information to the base station apparatus 100 using the single PUCCH (even if the plurality of PUCCHs is assigned in the UCC3). In other words, in FIG. 6, the mobile station apparatus 200 can perform transmission of the uplink control information using the PUCCH of the UCC1 and transmission of the uplink control information using the PUCCH of the UCC2 (this can be regarded as transmission of the uplink control information using the plurality of PUCCHs on the UCC1 and the UCC2), and transmission of the uplink control information using the single PUCCH on the UCC3 specified by the base station apparatus 100 in the same subframe (can perform simultaneous transmission).

As shown in FIG. 6, for example, the mobile station apparatus 200 can transmit the control information of the HARQ using the PUCCH of the UCC1 (PUCCH indicated by diagonal lines), the control information of the HARQ using the PUCCH of the UCC2 (PUCCH indicated by grid lines), and the channel state information and/or the control information of the HARQ using the single PUCCH of the UCC3 (PUCCH indicated by horizontal lines) in the same subframe.

FIG. 7 illustrates the operation of the mobile station apparatus 200 in the case where the PUSCH of the UCC2 (PUSCH indicated by filling) is assigned by the base station apparatus 100, when the mobile station apparatus 200 is transmitting the uplink control information using the single PUCCH in the uplink carrier components (the UCC1 and the UCC2) specified by the base station apparatus 100. In other words, in FIG. 7, the base station apparatus 100 assigns the PUSCH of the uplink carrier component on which the mobile station apparatus 200 has been instructed to transmit the uplink control information using the single PUCCH (any PUSCH of the uplink carrier components will do).

As has been described above, the base station apparatus 100 instructs the mobile station apparatus 200 to transmit the uplink control information using the single PUCCH in the plurality of uplink carrier components (the UCC1 and the UCC2), and the mobile station apparatus 200 transmits the uplink control information to the base station apparatus 100 using the single PUCCH in the plurality of uplink carrier components (the UCC1 and the UCC2) specified by the base station apparatus 100. In this occasion, if the PUSCH of the uplink carrier component (of the UCC1, or of the UCC2) which is specified that the uplink control information is transmitted thereon using the single PUCCH is assigned by the uplink transmission permission signal from the base station apparatus 100, the mobile station apparatus 200 transmits the uplink control information to the base station apparatus 100 using the assigned PUSCH. FIG. 7 shows that the PUSCH of the UCC2 is assigned by the uplink transmission permission signal from the base station apparatus 100. And the mobile station apparatus 200 transmits the uplink control information to the base station apparatus 100 using the assigned PUSCH, which is supposed to be transmitted using the PUCCH of the UCC1.

In other words, in FIG. 7, the mobile station apparatus 200 can perform transmission of the uplink control information using the PUSCH (of the UCC2) assigned by the uplink transmission permission signal from the base station apparatus 100, and transmission of the uplink control information using the plurality of PUCCHs (of the UCC3) in the same subframe (can perform simultaneous transmission). As shown in FIG. 7, for example, the mobile station apparatus 200 can transmit the control information of the HARQ (the uplink control information which is supposed to be transmitted using the single PUCCH) using the PUSCH of the UCC2 (PUSCH indicated by filling), and the channel state information and/or the control information of the HARQ using the plurality of PUCCHs of the UCC3 (PUCCHs indicated by horizontal lines, and the PUCCHs indicated by meshed lines) in the same subframe. In this occasion, the mobile station apparatus 200 transmits, to the base station apparatus 100, the control information of the HARQ using the assigned PUSCH, in a bundled or multiplexed manner in the uplink carrier components (the UCC1 and the UCC2) specified by the base station apparatus 100. Here, the uplink control information transmitted on the PUSCH of the UCC2 may be transmitted together with the uplink data (UL-SCH).

Similarly, in FIG. 8, the mobile station apparatus 200 instructed to transmit the uplink control information using the single PUCCH in the specific one uplink carrier component (UCC3), transmits the uplink control information to the base station apparatus 100 using the single PUCCH in the UCC3. In this occasion, if the PUSCH of the uplink carrier component (of the UCC3) specified by the base station apparatus 100 is assigned, the mobile station apparatus 200 transmits the uplink control information to the base station apparatus 100 using the assigned PUSCH. As shown in FIG. 8, for example, the mobile station apparatus can transmit the control information of the HARQ using the PUCCH of the UCC1 (PUCCH indicated by diagonal lines), the control information of the HARQ using the PUCCH of the UCC2 (PUCCH indicated by grid lines), and the channel state information and/or the control information of the HARQ using the PUSCH of the UCC3 (PUSCH indicated by filling) in the same subframe. Here, the uplink control information transmitted on the PUSCH of the UCC3 may be transmitted together with the uplink data (UL-SCH).

FIG. 9 illustrates the operation of the mobile station apparatus 200 in the case where the PUSCH of the UCC1 and the PUSCH of the UCC2 (the blacked-out PUSCH, the PUSCH indicated by filling) are respectively assigned by the base station apparatus 100, when the mobile station apparatus 200 is transmitting the uplink control information using the single PUCCH in the uplink carrier components (the UCC1 and the UCC2) specified by the base station apparatus 100.

In FIG. 9, if the PUSCHs of the uplink carrier components (of the UCC1, and of the UCC2) which is specified that the uplink control information is transmitted thereon using the single PUCCH are respectively assigned by the uplink transmission permission signals from the base station apparatus 100, the mobile station apparatus 200 transmits the uplink control information to the base station apparatus 100 using the PUSCH of the same carrier component as the uplink carrier component (UCC1) on which the PUCCH is mapped, the PUCCH which is supposed to be used for transmitting the uplink control information. FIG. 9 shows that the PUSCHs of the UCC1 and of the UCC2 respectively assigned by the uplink transmission permission signals from the base station apparatus 100. And the mobile station apparatus 200 transmits the uplink control information using the PUSCH of the UCC1, which is supposed to be transmitted using the PUCCH of the UCC1.

As shown in FIG. 9, for example, the mobile station apparatus 200 can transmit the control information of the HARQ using the PUSCH of the UCC1 (the blacked-out PUSCH), the uplink data (UL-SCH) using the PUSCH of the UCC2 (PUSCH indicated by filling), and the channel state information and/or the control information of the HARQ using the plurality of PUCCHs of the UCC3 (PUCCHs indicated by horizontal lines and the PUCCHs indicated by meshed lines) in the same subframe. Here, the uplink control information transmitted on the PUSCH of the UCC1 may be transmitted together with the uplink data (UL-SCH).

In this occasion, the mobile station apparatus 200 transmits the control information of the HARQ to the base station apparatus 100 using the assigned PUSCH, in a bundled or multiplexed manner in the uplink carrier components (UCC1 and UCC2) specified by the base station apparatus 100. In other words, the mobile station apparatus 200 selects the single PUCCH from the plurality of PUCCHs in the uplink carrier component specified by the base station apparatus 100, determines the PUSCH on which the uplink control information is mapped, according to the selection (according to the result of channel selection), and transmits the uplink control information to the base station apparatus 100 using the determined PUSCH.

For example, if the mobile station apparatus 200 instructed by the base station apparatus 100 to transmit the uplink control information using the single PUCCH in the UCC1 and UCC2 has selected the PUCCH of the UCC1 among the plurality of PUCCHs of the UCC1 and the UCC2 (if the PUCCH of the UCC1 has been selected by the channel selection), the uplink control information is transmitted using the PUCCH of the UCC1. In addition, for example, if the mobile station apparatus 200 instructed by the base station apparatus 100 to transmit the uplink control information using the single PUCCH in the UCC1 and the UCC2 has selected the PUCCH of the UCC2 among the plurality of PUCCHs of the UCC1 and the UCC2 (if the PUCCH of the UCC2 has been selected by the channel selection), the uplink control information is transmitted using the PUCCH of the UCC2.

As has been described above, when the base station apparatus 100 and the mobile station apparatus 200 communicate with each other in a wide frequency band using the carrier components in a multiple manner, the base station apparatus 100 can restrict the PUCCHs for the mobile station apparatus 200 for transmitting the uplink control information by transmitting, to the mobile station apparatus 200, the information for indicating transmission of the uplink control information using the single PUCCH in the specific one uplink carrier component or the plurality of uplink carrier components, and thus it becomes possible to transmit the data (the information) with transmission power in the mobile station apparatus 200 suppressed to a low level. In addition, the base station apparatus 100 can indicate to the mobile station apparatus 200 the specific one uplink carrier component or the plurality of uplink carrier components for transmitting the uplink control information using the single PUCCH, and the mobile station apparatus 200 can transmit the uplink control information using the single PUCCH in the uplink carrier component specified by the base station apparatus 100, whereby simultaneous transmission of the plurality of PUCCHs can be performed with transmission power in the mobile station apparatus 200 suppressed to a low level.

In addition, it becomes possible for the base station apparatus 100 to indicate the uplink carrier component for transmitting the uplink control information using the single PUCCH according to the status of the mobile station apparatus 200, whereby flexible control can be performed when the mobile station apparatus 200 transmits the uplink control information. Furthermore, the mobile station apparatus 200 can transmit the uplink control information using the PUSCH of the uplink carrier component specified by the base station apparatus 100, and thereby simultaneous transmission of the PUSCH and the PUCCH can be performed with transmission power in the mobile station apparatus 200 suppressed to a low level.

(A) In addition, the present invention can employ the following embodiment. That is, the mobile communication system according to the present embodiment is a mobile communication system in which a base station apparatus and a mobile station apparatus communicate with each other using a plurality of carrier components, wherein the base station apparatus transmits, to the mobile station apparatus, information for instructing the mobile station apparatus to transmit uplink control information using a single physical uplink control channel in a specific one uplink carrier component or a plurality of uplink carrier components, and the mobile station apparatus, upon receiving the information from the base station apparatus, transmits the uplink control information to the base station apparatus using a single physical uplink control channel, even if a plurality of physical uplink control channels is assigned in the specific one uplink carrier component or a plurality of uplink carrier components.

(B) Additionally, in the mobile communication system according to the present embodiment, if a physical uplink shared channel in the specific one uplink carrier component or the plurality of uplink carrier components is assigned when transmitting the uplink control information, the mobile station apparatus transmits the uplink control information to the base station apparatus using the physical uplink shared channel.

(C) Additionally, in the mobile communication system according to the present embodiment, the base station apparatus transmits, to the mobile station apparatus, the information included in a radio resource control signal.

(D) Additionally, in the mobile communication system according to the present embodiment, the uplink control information is the channel state information indicating the downlink channel state.

(E) Additionally, in the mobile communication system according to the present embodiment, the uplink control information is the scheduling request which requests assignment of resource for transmitting uplink data.

(F) Additionally, in the mobile communication system according to the present embodiment, the uplink control information is control information of the HARQ for a physical downlink control channel and/or downlink transport block.

(G) In addition, the base station apparatus according to the present embodiment is a base station apparatus in a mobile communication system in which a base station apparatus and a mobile station apparatus communicate with each other using a plurality of carrier components, wherein the base station apparatus comprising means for transmitting information to the mobile station apparatus for indicating that the mobile station apparatus transmits uplink control information using a single physical uplink control channel in a specific one uplink carrier component or a plurality of uplink carrier components.

(H) Additionally, in the base station apparatus according to the present embodiment, the means for transmitting the information to the mobile station apparatus transmits, to the mobile station apparatus, the information included in a radio resource control signal.

(I) In addition, the mobile station apparatus according to the present embodiment is a mobile station apparatus in a mobile communication system in which a base station apparatus and a mobile station apparatus communicate with each other using a plurality of carrier components, the mobile station apparatus comprising means for receiving, from the base station apparatus, information for indicating transmission of uplink control information using a single physical uplink control channel in a specific one uplink carrier component or a plurality of uplink carrier components, and means for transmitting, upon receiving the information, the uplink control information to the base station apparatus using a single physical uplink control channel even if a plurality of physical uplink control channels is assigned in the specific one uplink carrier component or a plurality of uplink carrier components.

(J) Additionally, in the mobile station apparatus according to the present embodiment, the means for transmitting the uplink control information to the base station apparatus transmits the uplink control information to the base station apparatus using the physical uplink shared channel, if a physical uplink shared channel in the specific one uplink carrier component or a plurality of uplink carrier components is assigned by the base station apparatus when transmitting the uplink control information.

(K) In addition, the communication method according to the present embodiment is a communication method of a base station apparatus in a mobile communication system in which the base station apparatus and a mobile station apparatus communicate with each other using a plurality of carrier components, wherein the base station apparatus transmits, to the mobile station apparatus, information for indicating that the mobile station apparatus transmits uplink control information using a single physical uplink control channel in a specific one uplink carrier component or a plurality of uplink carrier components.

(L) Additionally, in the communication method according to the present embodiment, the base station apparatus transmits, to the mobile station apparatus, the information included in a radio resource control signal.

(M) In addition, the communication method according to the present embodiment is a communication method of a mobile station apparatus in a mobile communication system in which a base station apparatus and a mobile station apparatus communicate with each other using a plurality of carrier components, the method comprising transmitting, if information for indicating transmission of uplink control information using a single physical uplink control channel in a specific one uplink carrier component or a plurality of uplink carrier components is received from the base station apparatus, the uplink control information to the base station apparatus using a single physical uplink control channel, even if a plurality of physical uplink control channels is assigned in the specific one uplink carrier component or a plurality of the specification uplink carrier components.

(N) Additionally, in the communication method according to the present embodiment, wherein if a physical uplink shared channel in the specific one uplink carrier component or a plurality of uplink carrier components is assigned by the base station apparatus when transmitting the uplink control information, the mobile station apparatus transmits the uplink control information to the base station apparatus using the physical uplink shared channel.

The embodiments described above are also applied to integrated circuits mounted on the base station apparatus 100 and the mobile station apparatus 200. Additionally, in the embodiments described above, control of the base station apparatus 100 and the mobile station apparatus 200 may be performed by recording a program for realizing respective functions in the base station apparatus 100 and respective functions in the mobile station apparatus 200 on a computer-readable recording medium, and causing a computer system to read and execute the program recorded on the recording medium. Note that the "computer system" mentioned here is supposed to include the OS and hardware such as peripheral devices.

In addition, the "computer-readable recording medium" also refers to storage devices such as a flexible disk, a magnet-optical disk, a ROM, a portable medium such as a CD-ROM, a hard disk which is built in a computer system. Furthermore, the "computer-readable recording medium" is supposed to include a medium that keeps a program dynamically for a short time such as a communication line for transmitting the program via a network such as the Internet or a communication network such as a telephone line, or a medium that keeps a program for a certain period such as a volatile memory inside a computer system that works as a server or a client in such a case. In addition, the program may be one for realizing a part of the functions described above, or one that can implement the functions described above by a combination with a program which has been already recorded in the computer system.

Although embodiments of the invention have been described in detail above with reference to the drawings, specific configurations are not limited to the embodiments, and thus designs or the like are also included in the claims within a range not deviating from the subject matter of the invention.

REFERENCE NUMERALS 100 base station apparatus
101 data control units
102 transmission data modulation unit
103 wireless unit
104 scheduling unit
105 channel estimation unit
106 received data demodulation unit
107 data extraction unit
108 higher layer
109 antenna
110 radio resource control unit
200 mobile station apparatus
201 data control unit
202 transmission data modulation unit
203 wireless unit
204 scheduling unit
205 channel estimation unit
206 received data demodulation unit
207 data extraction unit
208 higher layer
209 antenna
210 radio resource control unit

The invention claimed is:

1. A mobile station apparatus that is configured to communicate with a base station apparatus using a plurality of uplink component carriers, the mobile station apparatus comprising:

a receiving unit configured to receive using a radio resource control signal, from the base station apparatus, first information indicating a first uplink component carrier on which first uplink control information is transmitted using a single first physical uplink control channel resource, the first uplink component carrier being included in the plurality of uplink component carriers, the receiving unit being configured to receive using a radio resource control signal, from the base station apparatus, second information indicating a second uplink component carrier on which second uplink control information is transmitted using a single second physical uplink control channel resource, the second uplink component carrier being included in the plurality of uplink component carriers, and a transmitting unit configured to transmit, to the base station apparatus, the first uplink control information using the single first physical uplink control channel resource on the first uplink component carrier in a case that a plurality of first physical uplink control channel resources is assigned, the single first physical uplink control channel resource being selected from the plurality of first physical uplink control channel resources, and the first uplink control information being for more than one first downlink component carriers, the transmitting unit configured to transmit, to the base station apparatus, the second uplink control information using the single second physical uplink control channel resource on the second uplink component carrier in a case that a plurality of second physical uplink control channel resources is assigned, the single second physical uplink control channel resource being selected from the plurality of second physical uplink control channel resources, and the second uplink control information being for more than one second downlink component carriers.

2. The mobile station apparatus according to claim 1, wherein the first uplink control information is used for indicating a positive acknowledgment (ACK) or a negative acknowledgment (NACK), and the second uplink control information is used for indicating a positive acknowledgment (ACK) or a negative acknowledgment (NACK).

3. A base station apparatus that is configured to communicate with a mobile station apparatus using a plurality of uplink component carriers, the base station apparatus comprising:
   a transmitting unit configured to transmit using a radio resource control signal, to the mobile station apparatus, first information indicating a first uplink component carrier on which first uplink control information is transmitted using a single first physical uplink control channel resource, the first uplink component carrier being included in the plurality of uplink component carriers,
   the transmitting unit being configured to transmit using a radio resource control signal, to the mobile station apparatus, second information indicating a second uplink component carrier on which second uplink control information is transmitted using a single second physical uplink control channel resource, the second uplink component carrier being included in the plurality of uplink component carriers, and
   a receiving unit configured to receive, from the mobile station apparatus, the first uplink control information using the single first physical uplink control channel resource on the first uplink component carrier in a case that a plurality of first physical uplink control channel resources is assigned, the single first physical uplink control channel resource being selected from the plurality of first physical uplink control channel resources, and the first uplink control information being for more than one first downlink component carriers,
   the receiving unit configured to receive, from the mobile station apparatus, the second uplink control information using the single second physical uplink control channel resource on the second uplink component carrier in a case that a plurality of second physical uplink control channel resources is assigned, the single second physical uplink control channel resource being selected from the plurality of second physical uplink control channel resources, and the second uplink control information being for more than one second downlink component carriers.

4. The base station apparatus according to claim 3, wherein
   the first uplink control information is used for indicating a positive acknowledgment (ACK) or a negative acknowledgment (NACK), and
   the second uplink control information is used for indicating a positive acknowledgment (ACK) or a negative acknowledgment (NACK).

5. A communication method of a mobile station apparatus that is configured to communicate with a base station apparatus using a plurality of uplink component carriers, the communication method comprising:
   receiving using a radio resource control signal, from the base station apparatus, first information indicating a first uplink component carrier on which first uplink control information is transmitted using a single first physical uplink control channel resource, the first uplink component carrier being included in the plurality of uplink component carriers,
   receiving using a radio resource control signal, from the base station apparatus, second information indicating a second uplink component carrier on which second uplink control information is transmitted using a single second physical uplink control channel resource, the second uplink component carrier being included in the plurality of uplink component carriers,
   transmitting, to the base station apparatus, the first uplink control information using the single first physical uplink control channel resource on the first uplink component carrier in a case that a plurality of first physical uplink control channel resources is assigned, the single first physical uplink control channel resource being selected from the plurality of first physical uplink control channel resources, and the first uplink control information being for more than one first downlink component carriers, and
   transmitting, to the base station apparatus, the second uplink control information using the single second physical uplink control channel resource on the second uplink component carrier in a case that a plurality of second physical uplink control channel resources is assigned, the single second physical uplink control channel resource being selected from the plurality of second physical uplink control channel resources, and the second uplink control information being for more than one second downlink component carriers.

6. The communication method according to claim 5, wherein
   the first uplink control information is used for indicating a positive acknowledgment (ACK) or a negative acknowledgment (NACK), and
   the second uplink control information is used for indicating a positive acknowledgment (ACK) or a negative acknowledgment (NACK).

7. A communication method of a base station apparatus that is configured to communicate with a mobile station apparatus using a plurality of uplink component carriers, the communication method comprising:
   transmitting using a radio resource control signal, to the mobile station apparatus, first information indicating a first uplink component carrier on which first uplink control information is transmitted using a single first physical uplink control channel resource, the first uplink component carrier being included in the plurality of uplink component carriers,
   transmitting using a radio resource control signal, to the mobile station apparatus, second information indicating a second uplink component carrier on which second uplink control information is transmitted using a single second physical uplink control channel resource, the second uplink component carrier being included in the plurality of uplink component carriers,
   receiving, from the mobile station apparatus, the first uplink control information using the single first physical uplink control channel resource on the first uplink component carrier in a case that a plurality of first physical uplink control channel resources is assigned, the single first physical uplink control channel resource being selected from the plurality of first physical uplink control channel resources, and the first uplink control information being for more than one first downlink component carriers, and
   receiving, from the mobile station apparatus, the second uplink control information using the single second physical uplink control channel resource on the second uplink component carrier in a case that a plurality of second physical uplink control channel resources is assigned, the single second physical uplink control channel resource being selected from the plurality of second physical uplink control channel resources, and the second uplink control information being for more than one second downlink component carriers.

8. The communication method according to claim 7, wherein
  the first uplink control information is used for indicating a positive acknowledgment (ACK) or a negative acknowledgment (NACK), and
  the second uplink control information is used for indicating a positive acknowledgment (ACK) or a negative acknowledgment (NACK).

* * * * *